(12) United States Patent
Machael et al.

(10) Patent No.: US 9,592,757 B2
(45) Date of Patent: Mar. 14, 2017

(54) ARMREST

(71) Applicant: HNI Technologies Inc., Muscatine, IA (US)

(72) Inventors: Jay R. Machael, Muscatine, IA (US); Brad Malli, Bettendorf, IA (US)

(73) Assignee: HNI Technologies Inc., Muscatine, IA (US)

( * ) Notice: Subject to any disclaimer, the term of this patent is extended or adjusted under 35 U.S.C. 154(b) by 0 days.

(21) Appl. No.: 14/689,976

(22) Filed: Apr. 17, 2015

(65) Prior Publication Data
US 2015/0298587 A1    Oct. 22, 2015

Related U.S. Application Data

(60) Provisional application No. 61/981,067, filed on Apr. 17, 2014.

(51) Int. Cl.
*A47C 7/54* (2006.01)
*B60N 2/46* (2006.01)
*A47C 1/03* (2006.01)

(52) U.S. Cl.
CPC .............. *B60N 2/4633* (2013.01); *A47C 1/03* (2013.01); *B60N 2/466* (2013.01)

(58) Field of Classification Search
CPC ....................................................... A47C 1/03
USPC ................................................... 297/411.37
See application file for complete search history.

(56) References Cited

U.S. PATENT DOCUMENTS

| | | |
|---|---|---|
| 278,004 A | 5/1883 | Farbar |
| 979,049 A | 12/1910 | Thomson |
| 5,380,065 A * | 1/1995 | Rohrer ..................... A47C 1/03 297/411.37 X |
| 5,393,125 A | 2/1995 | Watson et al. |
| 5,484,187 A * | 1/1996 | Doerner .................... A47C 1/03 297/411.37 X |
| 5,590,934 A | 1/1997 | Gibbs |
| 5,634,537 A | 6/1997 | Thorn |
| 5,641,203 A * | 6/1997 | Van De Riet ............ A47C 1/03 297/411.37 X |

(Continued)

FOREIGN PATENT DOCUMENTS

| | | |
|---|---|---|
| DE | 29809099 U1 | 7/1999 |
| EP | 0958765 B1 | 7/2003 |

(Continued)

OTHER PUBLICATIONS

International Search Report and Written Opinion issued in PCT/IS2008/05893, mailed Jul. 17, 2008, 9 pages.

(Continued)

*Primary Examiner* — Rodney B White
(74) *Attorney, Agent, or Firm* — Faegre Baker Daniels LLP

(57) ABSTRACT

An armrest that includes a mounting plate, a block member, and a link member. The link member has a first end and a second end that opposes the first end. The link member is engaged with the mounting plate at a first pivot toward the first end to pivot the link member at the first pivot and laterally move the second end. The link member is engaged with the block member at a second pivot toward the second end to pivot the block member at the second pivot and laterally move an end of the block member that faces the first end.

21 Claims, 20 Drawing Sheets

(56) References Cited

U.S. PATENT DOCUMENTS

| | | | |
|---|---|---|---|
| 5,651,586 A * | 7/1997 | Groth | A47C 1/03 297/411.37 X |
| 5,876,097 A * | 3/1999 | Cao | A47C 1/03 297/411.37 X |
| 5,927,811 A | 7/1999 | Tseng | |
| 5,971,484 A | 10/1999 | Lamart et al. | |
| 5,975,640 A * | 11/1999 | Chen | A47C 1/03 297/411.37 X |
| 5,984,416 A | 11/1999 | Waldo et al. | |
| 6,017,091 A * | 1/2000 | Cao | A47C 1/03 297/411.37 X |
| 6,045,191 A * | 4/2000 | Piretti | A47C 1/03 297/411.37 X |
| 6,059,366 A | 5/2000 | Hu | |
| 6,213,556 B1 * | 4/2001 | Chen | A47C 1/03 297/411.37 X |
| 6,290,300 B1 * | 9/2001 | Sutton | A47C 7/543 297/411.37 X |
| 6,302,486 B1 | 10/2001 | Lamart et al. | |
| 6,315,362 B1 | 11/2001 | Chuang | |
| 6,336,680 B1 | 1/2002 | Lee | |
| 6,398,309 B1 | 6/2002 | Chen | |
| 6,398,909 B1 | 6/2002 | Klerelid | |
| 6,520,587 B2 | 2/2003 | Noiseux | |
| 6,523,898 B1 | 2/2003 | Ball et al. | |
| 6,540,300 B2 * | 4/2003 | Piretti | A47C 1/03 297/411.37 X |
| 6,572,195 B1 | 6/2003 | Lee | |
| 6,592,085 B2 | 7/2003 | Iwata et al. | |
| 6,702,386 B2 | 3/2004 | Davis et al. | |
| 6,709,058 B1 | 3/2004 | Diffrient | |
| 6,799,803 B1 * | 10/2004 | Lee | A47C 1/03 297/411.37 X |
| 6,802,566 B2 | 10/2004 | Prince et al. | |
| 6,811,224 B2 | 11/2004 | Roney et al. | |
| 6,840,582 B2 | 1/2005 | Burwell et al. | |
| 6,908,158 B2 | 6/2005 | Willette et al. | |
| 6,959,965 B2 | 11/2005 | Diffrient | |
| 6,969,116 B2 | 11/2005 | Machael et al. | |
| 6,974,189 B2 | 12/2005 | Machael et al. | |
| 6,994,400 B2 | 2/2006 | Koepke et al. | |
| 7,066,538 B2 | 6/2006 | Machael et al. | |
| 7,066,546 B2 | 6/2006 | Trego et al. | |
| 7,188,907 B1 | 3/2007 | Lai | |
| 7,201,449 B2 * | 4/2007 | Tsai | A47C 1/03 297/411.37 X |
| 7,246,859 B2 | 7/2007 | Igarashi et al. | |
| 7,341,313 B2 * | 3/2008 | Bedford | A47C 1/03 297/411.37 X |
| 7,559,609 B2 | 7/2009 | Tsai | |
| 7,581,791 B2 | 9/2009 | Diffrient | |
| 7,744,159 B2 | 6/2010 | Lee | |
| 7,841,665 B2 | 11/2010 | Geister et al. | |
| 8,016,360 B2 | 9/2011 | Machael et al. | |
| 8,061,778 B2 | 11/2011 | Machael et al. | |
| 8,104,837 B2 | 1/2012 | Diffrient | |
| 8,235,468 B2 | 8/2012 | Fookes et al. | |
| 8,246,117 B2 | 8/2012 | Melhuish et al. | |
| 8,840,188 B2 * | 9/2014 | Diffrient | A47C 7/54 297/411.37 X |
| 2002/0036422 A1 | 3/2002 | Prince et al. | |
| 2002/0070598 A1 | 6/2002 | Perl | |
| 2003/0025378 A1 | 2/2003 | Lin | |
| 2003/0030317 A1 | 2/2003 | Chen | |
| 2003/0178882 A1 | 9/2003 | Schmitz et al. | |
| 2004/0130200 A1 | 7/2004 | Willette et al. | |
| 2005/0146192 A1 | 7/2005 | Trego et al. | |
| 2005/0146195 A1 | 7/2005 | Machael et al. | |
| 2006/0006723 A1 | 1/2006 | Diffrient | |
| 2006/0238011 A1 | 10/2006 | Bedford et al. | |
| 2006/0250018 A1 | 11/2006 | Tsai | |
| 2007/0164595 A1 | 7/2007 | Chi | |
| 2009/0033139 A1 * | 2/2009 | Machael | A47C 1/03 297/411.37 |
| 2009/0108660 A1 | 4/2009 | Weber et al. | |
| 2009/0302661 A1 | 12/2009 | Melhuish et al. | |
| 2011/0181090 A1 * | 7/2011 | Chen | A47C 1/03 297/411.37 |
| 2011/0248543 A1 | 10/2011 | Hitchcock et al. | |
| 2014/0145490 A1 * | 5/2014 | Chen | A47C 1/03 297/411.37 |

FOREIGN PATENT DOCUMENTS

| | | |
|---|---|---|
| WO | 2009026355 A1 | 2/2009 |
| WO | 2011130270 A1 | 10/2011 |
| WO | 2015161265 A1 | 10/2015 |

OTHER PUBLICATIONS

International Search Report and Written Opinion issued in PCT/US2015/026489, mailed Sep. 30, 2015, 13 pages.

Letter from Michael Follner of Knoll, Inc. to Steven Bradford of HNI Corporation, Sep. 19, 2008 (5 pages).

Letter from Steven Bradford of HNI Corporation to Michael Pollner of knoll, Inc., Sep. 26, 2008.

* cited by examiner

ARMREST

CROSS-REFERENCE TO RELATED APPLICATION

This application claims priority to Provisional Application No. 61/981,067, filed Apr. 17, 2014, which is herein incorporated by reference in its entirety.

BACKGROUND

Chair manufacturers continually strive to improve the comfort, benefits, aesthetics, and manufacturability of the chairs they produce. Often, chairs have features, such as a reclining back and an adjustable footrest, to increase comfort. Sometimes, chairs have features, such as adjustable seats, backs, back supports, armrests, and heights, to reduce or prevent injuries, including repetitive stress injury and back pain associated with sitting for long periods. Chairs are designed and built to fill an individual's needs and provide support where the individual needs it. In some chairs, the armrests and the arm pads are fixed. In other chairs, one or more of the armrests and the arm pads move for comfort, ease of entry and egress, and to support the user's arms.

SUMMARY

In some embodiments, an armrest includes a mounting plate, a block member, and a link member. The link member has a first end and a second end that opposes the first end, where the link member is engaged with the mounting plate at a first pivot toward the first end to pivot the link member at the first pivot and laterally move the second end. The link member is engaged with the block member at a second pivot toward the second end to pivot the block member at the second pivot and laterally move an end of the block member that faces the first end.

In some embodiments, the armrest includes a plate member situated between the mounting plate and the link member. The mounting plate includes a first boss and a second boss and the plate member includes apertures over the first boss and the second boss. The link member includes a pivot aperture over the first boss and a first curved slot over the second boss to pivot the link member at the pivot aperture and laterally move the second end of the link member. In some embodiments, the plate member includes a detent aperture and the link member includes a detent bump that engages the detent aperture to indicate a home position of the plate member and the link member.

In some embodiments, the block member includes a block aperture and a block boss and the link member includes a pivot boss and a second curved slot. The block aperture is over the pivot boss and the block boss is in the second curved slot to pivot the block member at the pivot boss and laterally move the end of the block member that faces the first end.

In some embodiments, the armrest includes a cover plate member situated between the block member and the link member. In some embodiments, the cover plate member includes a longitudinal slot and the block member is situated in the longitudinal slot. In some embodiments, the link member includes a detent bump and the cover plate member includes at least one of a detent tab and a detent slot that engages the detent bump to indicate a home position of the cover plate and the link member.

In some embodiments, an arm pad assembly includes a guide plate, a slide block, and a pivot link. The guide plate has a pivot aperture and a slot aperture and the slide block has a block aperture and a block boss. The pivot link has a back pivot aperture, a front pivot boss, a first curved slot, and a second curved slot. The pivot aperture and the back pivot aperture are held in alignment at a back pivot and the slot aperture and the first curved slot are held in alignment to pivot the pivot link at the back pivot and laterally move a front end of the pivot link. The block aperture is fit over the front pivot boss and the block boss is situated in the second curved slot to pivot the slide block at the second pivot aperture and laterally move a back end of the slide block.

In some embodiments, the arm pad assembly includes a cover plate that includes a longitudinal slot. The cover plate is situated between the slide block and the pivot link and the slide block is engaged in the longitudinal slot such that the cover plate slides longitudinally between the slide block and the pivot link.

In some embodiments, a chair includes a base to support the chair on a surface, a seat and a back supported by the base, and an armrest attached to the chair and supported by the base. The armrest includes a slide block, a cover plate, and a pivot link. The slide block includes a recessed portion and a block boss and the cover plate includes a longitudinal slot and a rim on at least one side of the longitudinal slot. The slide block is situated in the longitudinal slot with the recessed portion on the rim and the cover plate is situated between the pivot link and the slide block to slide longitudinally between the pivot link and the slide block. The pivot link includes a front pivot boss and a front curved slot. The block boss is situated in the front curved slot and the slide block is attached to the pivot link at the front pivot boss to pivot the slide block at the front pivot boss and laterally move a first end of the cover plate.

In some embodiments the armrest of the chair includes a mounting plate including a first boss and a second boss and the pivot link includes a back pivot aperture and a back curved slot. The first boss is situated in the back pivot aperture and the second boss is situated in the back curved slot to pivot the pivot link at the back pivot aperture and laterally move a second end of the cover plate that opposes the first end of the cover plate.

In some embodiments, a method of assembling an armrest includes the steps of providing a link member that has a first pivot situated toward a first end and a second pivot situated toward a second end that opposes the first end, attaching a block member to the link member at the second pivot to pivot the block member at the second pivot and laterally move an end of the block member that faces the first end, and attaching the link member to a plate at the first pivot to pivot the link member at the first pivot and laterally move the second end of the link member.

In some embodiments, the step of attaching the link member to the plate includes positioning a first boss of the plate in a pivot aperture of the link member, and positioning a second boss of the plate in a first curved slot of the link member. In some embodiments, the step of attaching the link member to the plate includes positioning a plate member between the link member and the plate, securing a first element into the first boss through the pivot aperture and the plate member, and securing a second element into the second boss through the first curved slot and the plate member. In some embodiments, the step of attaching the block member to the link member includes positioning a block aperture of the block member over a pivot boss of the link member and positioning a block boss of the block member in a second curved slot of the link member.

In some embodiments, the method of assembling an armrest includes providing a cover plate member that includes a longitudinal slot, situating the block member in the longitudinal slot, and situating the cover plate member between the block member and the link member prior to attaching the block member to the link member.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
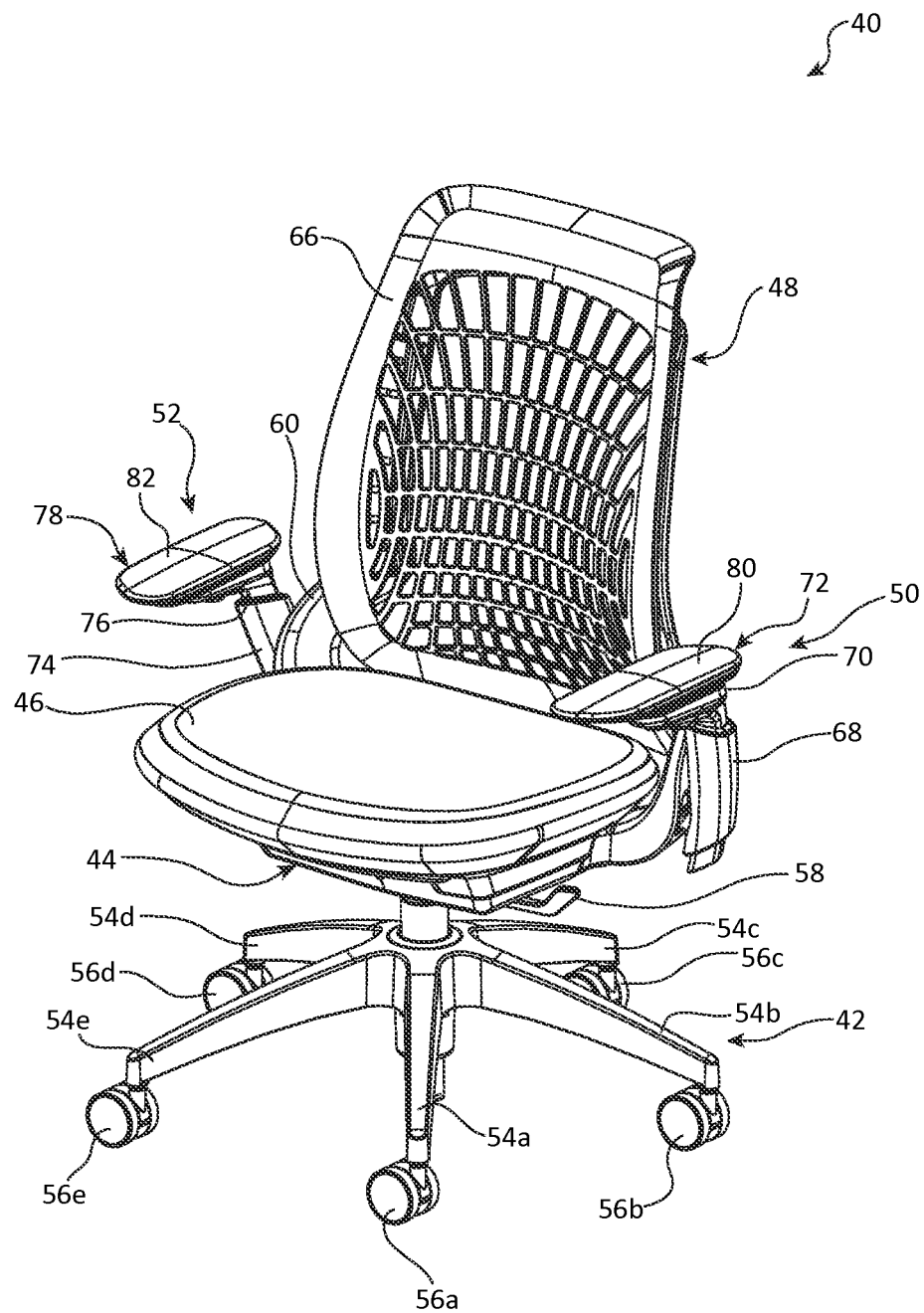
FIG. 1 is a diagram illustrating a perspective view of a chair, according to some embodiments.
Figure 2:
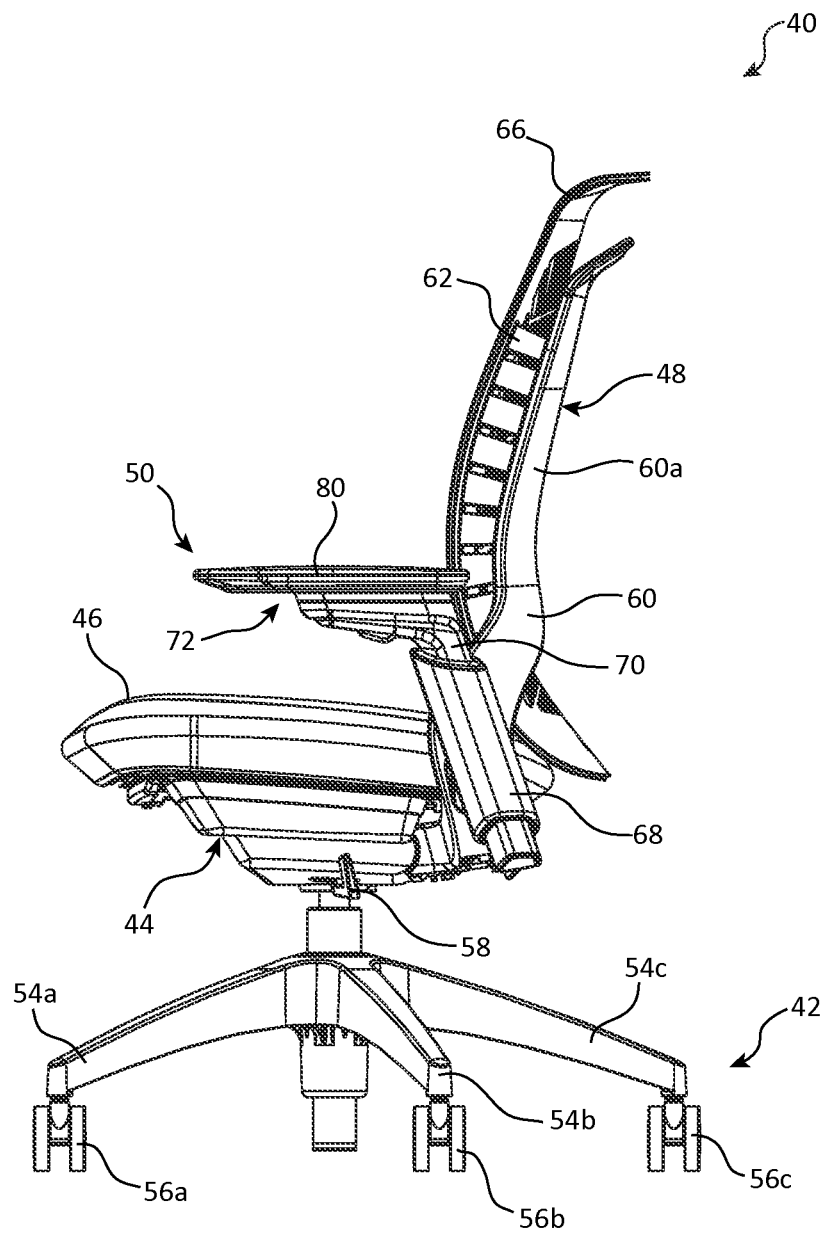
FIG. 2 is a diagram illustrating a side view of the chair of FIG. 1, according to some embodiments.
Figure 3:
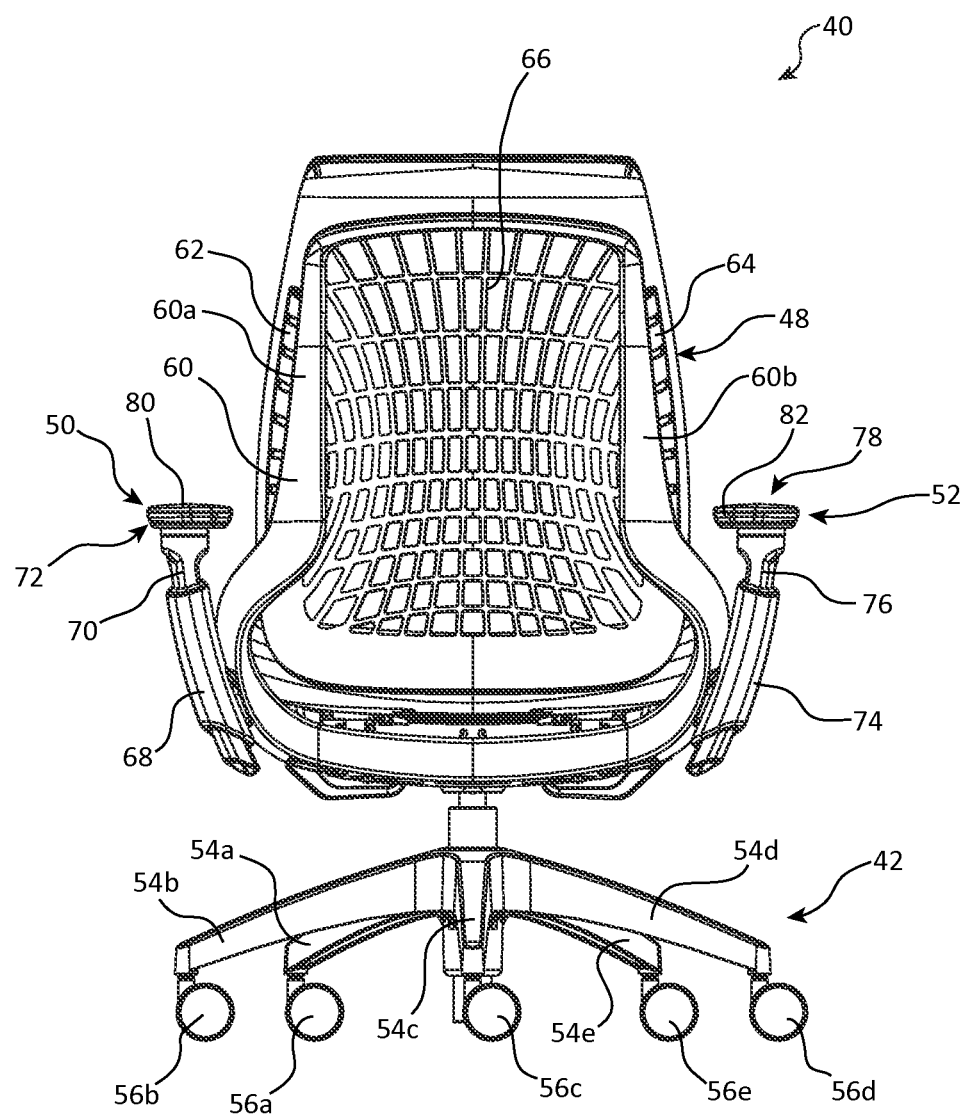
FIG. 3 is a diagram illustrating a back view of the chair of FIG. 1, according to some embodiments.

FIGS. 1-3 are diagrams illustrating a chair 40, according to some embodiments described in the disclosure. FIG. 1 is a diagram illustrating a perspective view of the chair 40, according to some embodiments. FIG. 2 is a diagram illustrating a side view of the chair 40, according to some embodiments, and FIG. 3 is a diagram illustrating a back view of the chair 40, according to some embodiments. The other side of the chair 40 is, optionally, a mirror image of the side shown in FIG. 2, but otherwise substantially similar, such that the other side can be described with reference to the side shown in FIG. 2.

The chair 40 includes a base 42, a hub 44, a seat 46, a back 48, and armrests 50 and 52. The base 42 supports the chair 40, including the hub 44, the seat 46, the back 48, and the armrests 50 and 52, on a surface, such as the floor of an office building. The hub 44 is connected to the base 42, and the seat 46 and the back 48 are connected to and supported by the hub 44. The armrests 50 and 52 are secured to the chair 40. In some embodiments, the armrests 50 and 52 are attached to the back 48. In some embodiments, the armrests 50 and 52 are attached to the hub 44. In some embodiments, the armrests 50 and 52 are attached directly to the base 42.

The base 42 includes leg supports 54a-54e that support the chair 40 on the surface. Each of the leg supports 54a-54e includes a corresponding wheel 56a-56e for rolling the chair 40 on the surface. In some embodiments, the base 42 includes fewer than five leg supports 54a-54e. In some embodiments, the base 42 includes more than five leg supports 54a-54e. In some embodiments, each of the leg supports 54a-54e includes a corresponding foot, such that the chair 40 does not roll.

In some embodiments, the hub 44 is rotatably connected to the base 42, such that the seat 46 and the back 48 swivel on the base 42 via the rotating hub 44. In some embodiments, the hub 44 includes a lever arm 58 for adjusting the seat height or other adjustable aspects of the chair 40. In some embodiments, the hub 44 includes a weight activated control mechanism for raising and lowering the seat 46 in response to the user leaning or applying weight to the back 48.

The seat 46 supports the body of the user and the back 48 supports the back of the user. In some embodiments, the seat 46 and the back 48 are fixed in relation to the base 42. In some embodiments, at least one of the seat 46 and the back 48 moves to support the user. In some embodiments, the back 48 flexes or bends to accommodate movements of the user.

The back 48 includes an upright frame 60, first and second flexible (flex) wings 62 and 64, and a back support 66. The upright frame 60 is supported by the base 42 and includes a first frame side 60a and a second frame side 60b. In some embodiments, the upright frame 60 is U-shaped, with one arm of the U-shaped frame at the first frame side 60a and the other, opposite arm at the second frame side 60b. In some embodiments, the upright frame 60 is Y-shaped, with one arm of the Y-shaped frame at the first frame side 60a and the other, opposite arm at the second frame side 60b. In some embodiments, the upright frame 60 is H-shaped, with one arm of the H-shaped frame at the first frame side 60a and the other, opposite arm at the second frame side 60b and an interconnecting member (not shown) extending between the first and second frame sides 60a and 60b. In some embodiments, the upright frame 60 is a closed loop frame, such as a rectangular, circular, or oval shaped frame. In some embodiments, the upright frame 60 is a shell, such as a solid shell or a rigid shell, which extends from the first frame side 60a to the second frame side 60b.

The back support 66 is attached to the upright frame 60 at the first frame side 60a and the second frame side 60b via the first and second flex wings 62 and 64. The first flex wing 62 is situated between the first frame side 60a and the back support 66 and the second flex wing 64 is situated between the second frame side 60b and the back support 66. The back 48 flexes to accommodate movements of the user. In some embodiments, the upright frame 60 is secured to the base 42. In some embodiments, the upright frame 60 is secured to the hub 44.

Figure 4:
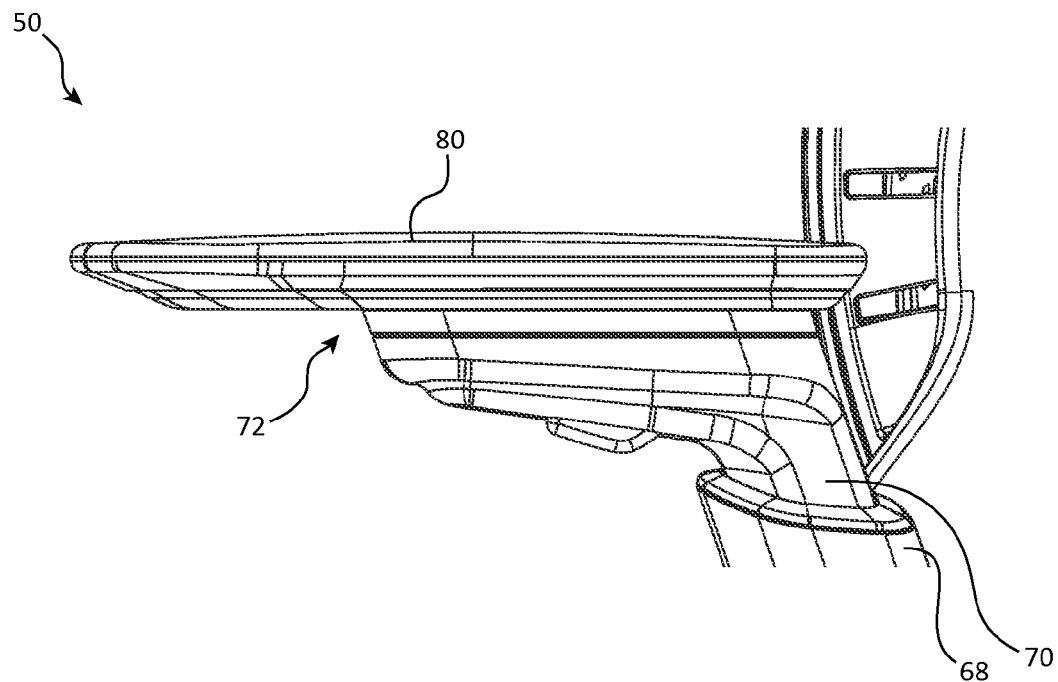
FIG. 4 is a diagram illustrating an enlarged side view of the left side armrest, according to some embodiments.
Figure 5:
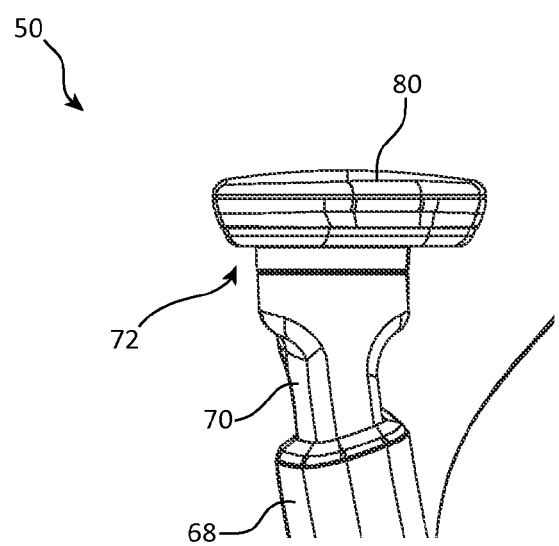
FIG. 5 is a diagram illustrating an enlarged rear view of the left side armrest, according to some embodiments.

FIGS. 4 and 5 are diagrams illustrating enlarged views of the left side armrest 50, according to some embodiments described in the disclosure. FIG. 4 is a diagram illustrating an enlarged side view of the left side armrest 50, according to some embodiments. FIG. 5 is a diagram illustrating an enlarged rear view of the left side armrest 50, according to some embodiments. The right side armrest 52 is, optionally, a mirror image of the left side armrest 50, but otherwise substantially similar, such that the right side armrest 52 can be described with reference to the left side armrest 50.

With reference to FIGS. 1-5, the armrests 50 and 52 support the arms of the user. The left side armrest 50 includes an armrest support 68, an arm pad support 70, and an arm pad assembly 72. The right side armrest 52 includes an armrest support 74, an arm pad support 76, and an arm pad assembly 78. In some embodiments, each of the armrests 50 and 52 swivels to move with an arm of the user. In some embodiments, the height of each of the armrests 50 and 52 is adjustable to accommodate users of different sizes.

The armrest supports 68 and 74 are attached to the chair 40 and supported by the base 42. In some embodiments, one or both of the armrest supports 68 and 74 are attached to the upright frame 60. In some embodiments, one or both of the armrest supports 68 and 74 are attached to one or more of the seat 46, the hub 44, and the base 42. In some embodiments, one or both of the armrest supports 68 and 74 are rigid support members. In some embodiments, one or both of the armrest supports 68 and 74 are flexible support members.

The arm pad support 70 is attached to and supported by the armrest support 68 and the arm pad support 76 is attached to and supported by the armrest support 74. In some embodiments, the arm pad support 70 is attached to the armrest support 68 such that the arm pad support 70 can be raised and lowered in relation to the armrest support 68. In some embodiments, the arm pad support 70 is inserted into the armrest support 68 such that the arm pad support 70 can be raised and lowered in relation to the armrest support 68. In some embodiments, the arm pad support 76 is attached to the armrest support 74 such that the arm pad support 76 can be raised and lowered in relation to the armrest support 74. In some embodiments, the arm pad support 76 is inserted into the armrest support 74 such that the arm pad support 76 can be raised and lowered in relation to the armrest support 74.

The left side arm pad assembly 72 is mounted to and supported by the arm pad support 70 and the right side arm pad assembly 78 is mounted to and supported by the arm pad support 76. The left side arm pad assembly 72 includes an arm pad 80 and the right side arm pad assembly 78 includes an arm pad 82. Each of the arm pads 80 and 82 can be moved forward and backward in relation to its corresponding arm pad support 70 and 76. Also, each end of each of the arm pads 80 and 82 can be moved laterally in relation to its corresponding arm pad support 70 and 76, where each of the arm pads 80 and 82 rotates or pivots at a first end to laterally move a second end of the arm pad in an arcuate lateral movement and each of the arm pads 80 and 82 rotates or pivots at the second end to laterally move the first end of the arm pad in an arcuate lateral movement. In some embodiments, each of the arm pad supports 70 and 76 can be raised and lowered to raise and lower the corresponding arm pad assemblies 72 and 78 and arm pads 80 and 82 to support the arms of the user.

Figure 6:
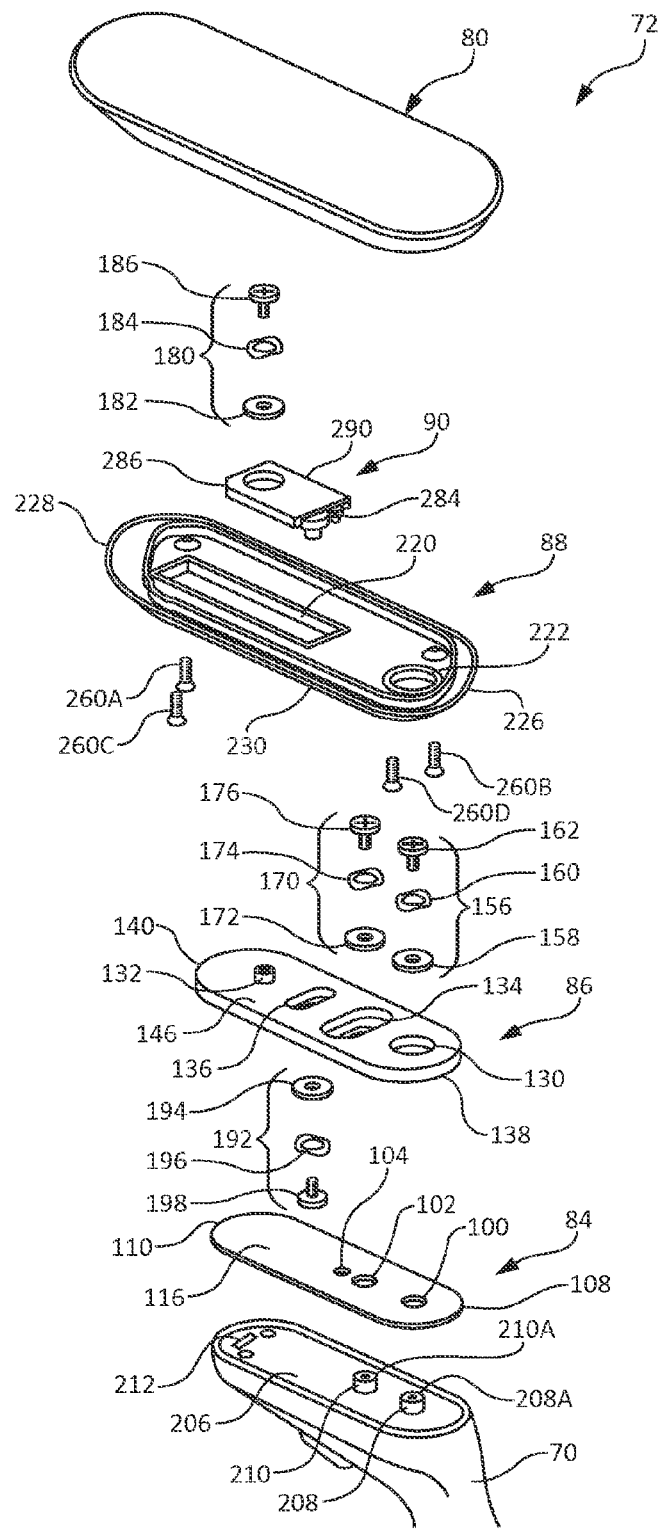
FIG. 6 is a diagram illustrating an exploded view of the left side arm pad assembly, according to some embodiments.

FIG. 6 is a diagram illustrating an exploded view of the left side arm pad assembly 72, according to some embodiments described in the disclosure. The left side arm pad assembly 72 includes a guide plate member 84, a pivot link member 86, a cover plate member 88, a slide block member 90, and the arm pad 80. The right side arm pad assembly 78 is, optionally, a mirror image of the left side arm pad assembly 72, but otherwise substantially similar, such that the right side arm pad assembly 78 can be described with reference to the left side arm pad assembly 72.

Figure 7A:
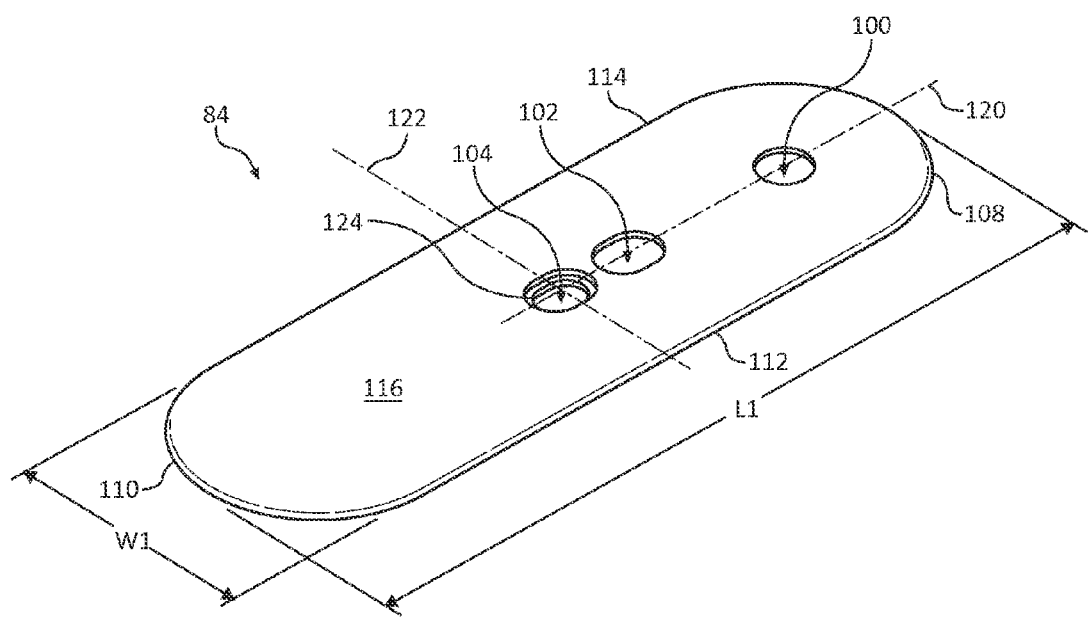
FIG. 7A is a diagram illustrating an enlarged perspective view of a guide plate member, according to some embodiments.
Figure 7B:
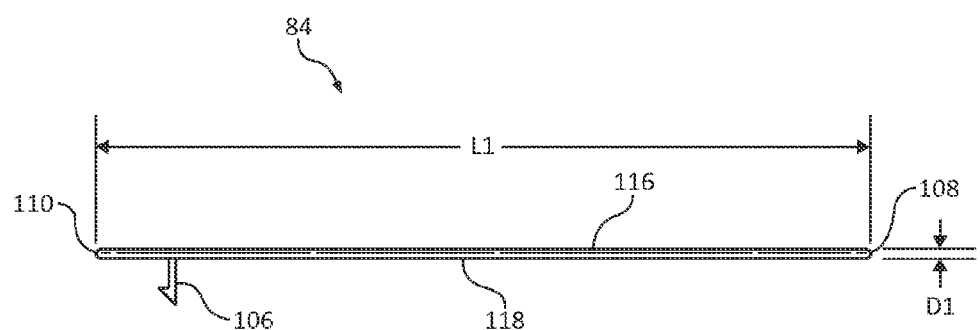
FIG. 7B is a diagram illustrating an enlarged side view of the guide plate member, according to some embodiments.

FIGS. 7A and 7B are diagrams illustrating an enlarged perspective view and a side view, respectively, of the guide plate member 84, according to some embodiments described in the disclosure. The guide plate member 84 is a racetrack oval shaped member that includes a pivot aperture 100, a slot aperture 102, a detent aperture 104, and, optionally, a mounting latch 106. The guide plate member 84 has a length L1 from a back or first end 108 to a front or second end 110, a width W1 from a left or first side 112 to a right or second side 114, and a depth D1 from a top side 116 to a bottom side 118.

The pivot aperture 100 is circular and situated toward the first end 108 and in the middle 120 between the first side 112 and the second side 114. The pivot aperture 100 is a through hole aperture defined by the guide plate member 84, such that the pivot aperture 100 extends through the top side 116 and the bottom side 118. In some embodiments, the pivot aperture 100 includes a pivot boss having a through hole aperture.

The slot aperture 102 is racetrack oval shaped and situated toward the center 122 of the guide plate member 84 between the first end 108 and the second end 110 and in the middle 120 between the first side 112 and the second side 114. The slot aperture 102 is a through hole aperture defined by the guide plate member 84, such that the slot aperture 102 extends through the top side 116 and the bottom side 118. In some embodiments, the slot aperture 102 includes a slot boss having a through hole aperture.

The detent aperture 104 is racetrack oval shaped and situated substantially at the center 122 between the first end 108 and the second end 110 and in the middle 120 between the first side 112 and the second side 114. The detent aperture 104 is a through hole aperture defined by the guide plate member 84, such that the detent aperture 104 extends through the top side 116 and the bottom side 118. The detent aperture 104 includes a beveled edge 124 on the top side 116. In some embodiments, the detent aperture 104 is an indented knotch in the top side 116 and not a through hole aperture.

The bottom side 118 is a flat surface, except for the latch 106 that protrudes from the bottom side 118. Also, toward the second end 110, the top side 116 is a flat surface. In some embodiments, the guide plate member 84 is a single, monolithic piece. In some embodiments, the guide plate member 84 is a machined part. In some embodiments, the guide plate member 84 is a molded part. In some embodiments, the guide plate member 84 is made out of a plastic material. In some embodiments, the guide plate member 84 is made out of metal, such as steel or aluminum.

Figure 8A:
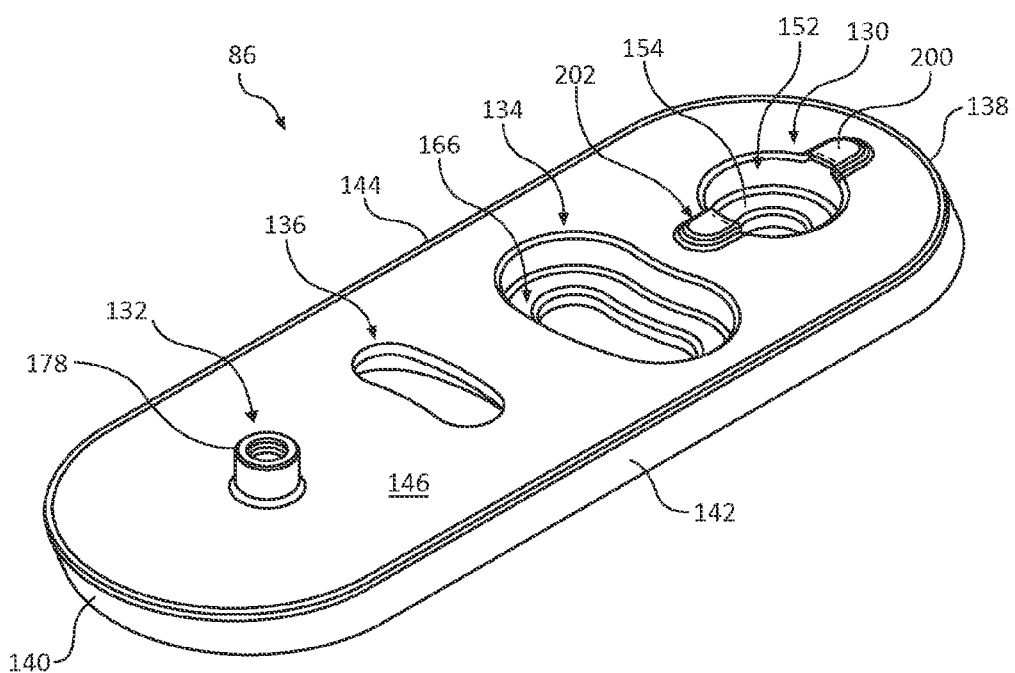
FIG. 8A is a diagram illustrating a top perspective view of a pivot link member, according to some embodiments.
Figure 8B:
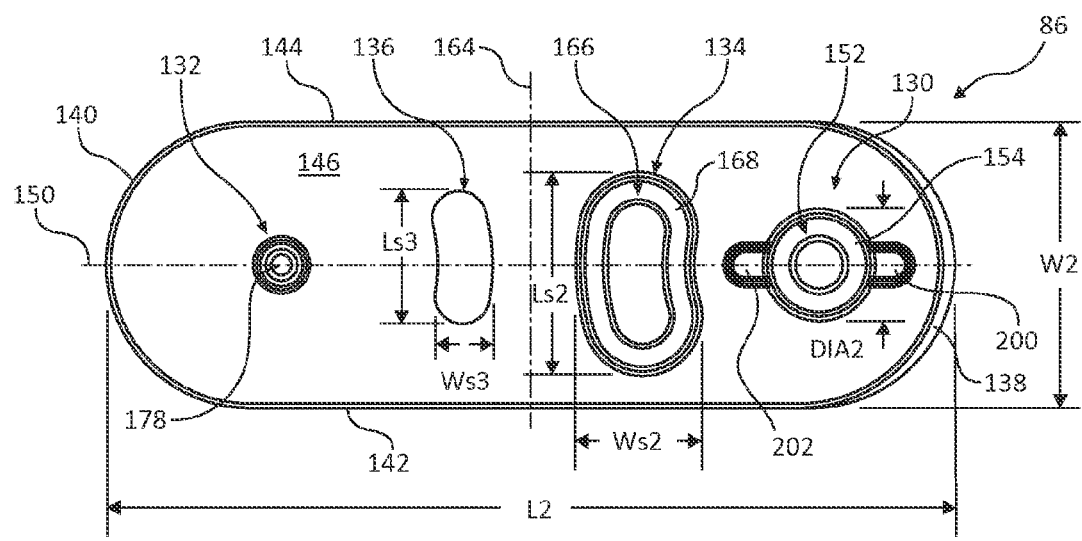
FIG. 8B is a diagram illustrating a top view of the pivot link member, according to some embodiments.
Figure 8C:
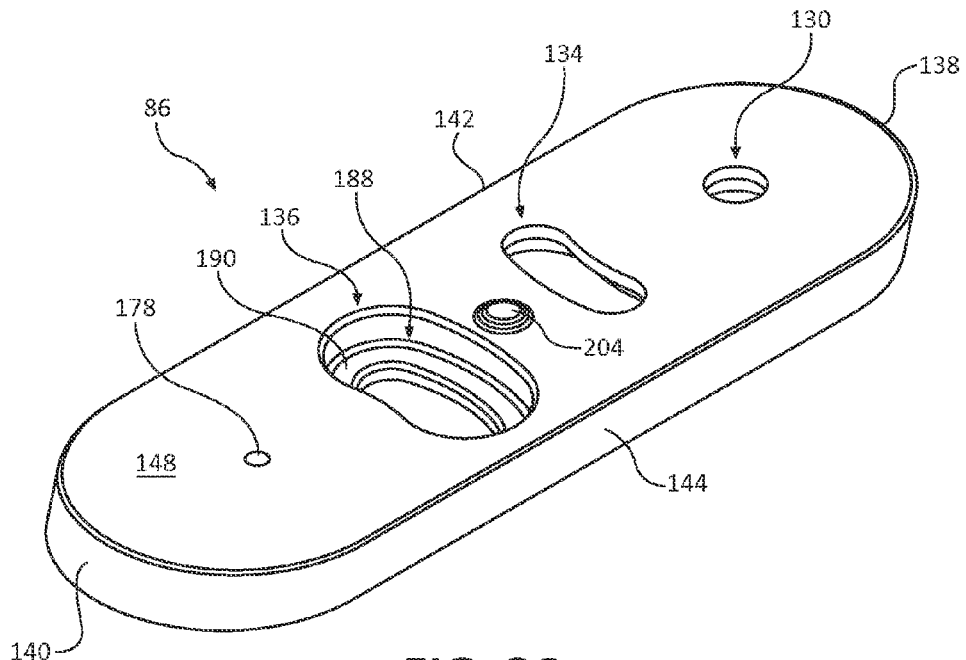
FIG. 8C is a diagram illustrating a bottom perspective view of the pivot link member, according to some embodiments.
Figure 8D:
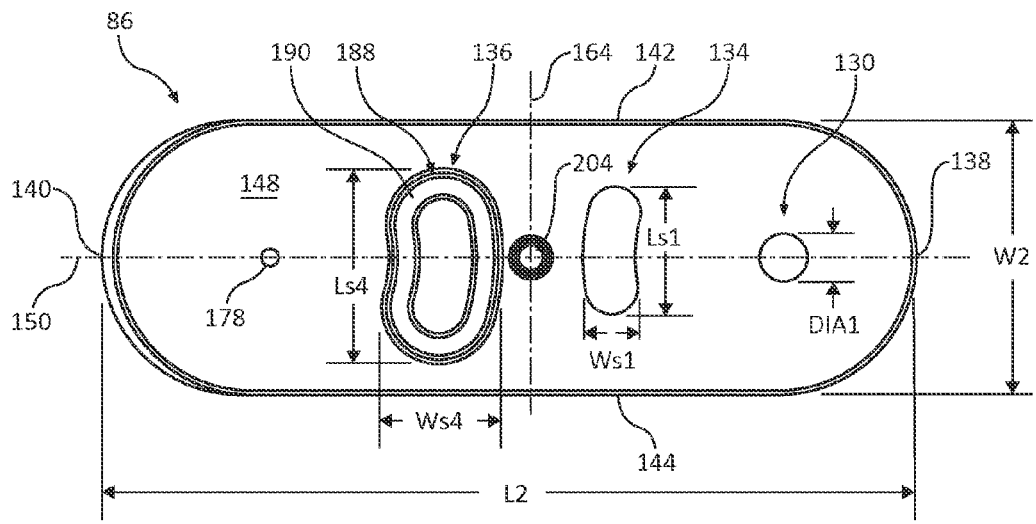
FIG. 8D is a diagram illustrating a bottom view of the pivot link member, according to some embodiments.
Figure 8E:
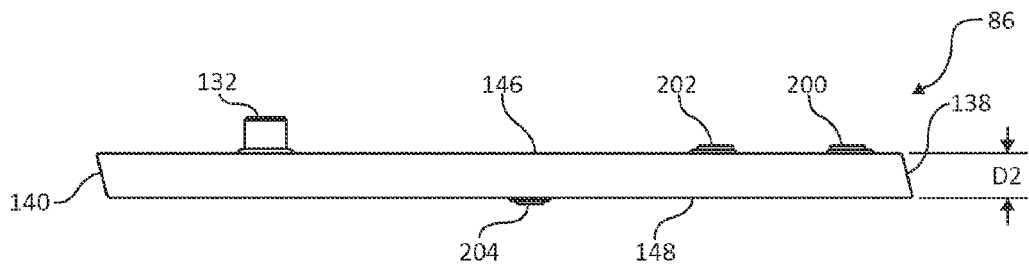
FIG. 8E is a diagram illustrating a side view of the pivot link member, according to some embodiments.

FIGS. 8A-8E are diagrams illustrating the pivot link member 86, according to some embodiments described in the disclosure. FIG. 8A is a diagram illustrating a top perspective view of the pivot link member 86, according to some embodiments, and FIG. 8B is a diagram illustrating a top view of the pivot link member 86, according to some embodiments. FIG. 8C is a diagram illustrating a bottom perspective view of the pivot link member 86, according to some embodiments, and FIG. 8D is a diagram illustrating a bottom view of the pivot link member 86, according to some embodiments. FIG. 8E is a diagram illustrating a side view of the pivot link member 86, according to some embodiments.

The pivot link member 86, also referred to as a dual pivot link member, is a racetrack oval shaped member including a back pivot aperture 130, a front pivot boss 132, a first curved slot 134, and a second curved slot 136. The pivot link member 86 has a length L2 from a back or first end 138 to a front or second end 140, a width W2 from a left or first side 142 to a right or second side 144, and a depth D2 from a top side 146 to a bottom side 148. In some embodiments, the pivot link member 86 is larger than the guide plate member 84, such that L2 is greater than L1 and W2 is greater than W1. In some embodiments, the pivot link member 86 is smaller than the guide plate member 84, such that L2 is less than L1 and W2 is less than W1. In some embodiments, the pivot link member 86 is substantially the same size as the guide plate member 84, such that L2 is substantially the same as L1 and W2 is substantially the same as W1. In some embodiments, one or more of the length L2 and the width W2 of the pivot link member 86 is different than the length D1 and width W1 of the guide plate member 84.

The back pivot aperture 130 is situated toward the first end 138 and in the middle 150 between the first side 142 and the second side 144. The back pivot aperture 130 is a circular through hole that extends through the top side 146 and the bottom side 148. The back pivot aperture 130 has a diameter Dia1 at the bottom side 148 and includes a circular pocket 152 that has a diameter Dia2 at the top side 146. The diameter Dia1 is smaller than the diameter Dia2. The pocket 152 defines a recessed ledge 154 in the back pivot aperture 130 and receives a fastener element 156 that includes a first washer 158, a second washer 160, and a screw 162 as shown in FIG. 6.

The first curved slot 134 is a kidney shaped through hole that extends through the top side 146 and the bottom side 148. The first curved slot 134 is situated toward the center 164 between the first end 138 and the second end 140 and offset from the middle 150 toward the first side 142. The first curved slot 134 has a length Ls1 and a width Ws1 at the bottom side 148 and includes a kidney shaped pocket 166 that has a length Ls2 and a width Ws2 at the top side 146. The length Ls2 and the width Ws2 at the top side 146 are larger than the length Ls1 and the width Ws1 at the bottom side 148, respectively. The kidney shaped pocket 166 defines a recessed ledge 168 in the first curved slot 134, where the pocket 164 receives a fastener element 170 that includes a first washer 172, a second washer 174, and a screw 176 as shown in FIG. 6.

The front pivot boss 132 is situated toward the second end 140 and in the middle 150 between the first side 142 and the second side 144. The front pivot boss 132 is a circular boss that protrudes from the top side 146 and includes a through hole aperture 178 that extends through the front pivot boss 132 and the bottom side 148. The front pivot boss 132 receives part of a fastener element 180 that includes a first washer 182, a second washer 184, and a screw 186 as shown in FIG. 6. The front pivot boss 132 receives the screw 186. In some embodiments, the aperture 178 in the front pivot boss 132 extends into the front pivot boss 132 and not through the bottom side 148.

The second curved slot 136 is a kidney shaped through hole that extends through the top side 146 and the bottom side 148. The second curved slot 136 is situated toward the center 164 between the first end 138 and the second end 140 and offset from the middle 150 toward the second side 144. The second curved slot 136 has a length Ls3 and a width Ws3 at the top side 146 and includes a kidney shaped pocket 188 that has a length Ls4 and a width Ws4 at the bottom side 148. The length Ls4 and the width Ws4 are larger than the length Ls3 and the width Ws3, respectively. The kidney shaped pocket 188 defines a recessed ledge 190 in the second curved slot 136, where the pocket 188 receives a fastener element 192 that includes a first washer 194, a second washer 196, and a screw 198 as shown in FIG. 6.

The pivot link member 86 further includes a first detent bump 200 and a second detent bump 202 next to the back pivot aperture 130 and on the top side 146, and a third detent bump 204 on the bottom side 148. The first detent bump 200 protrudes from the top side 146 and is situated in the middle 150 and toward the first end 138. The second detent bump 202 protrudes from the top side 146 and is situated in the middle 150 and between the back pivot aperture 130 and the first curved slot 134. The third detent bump 204 protrudes from the bottom side 148 and is situated in the middle 150 and the center 164 of the bottom side 148. The detent bumps 200, 202, and 204 are used to indicate home positions for the left arm pad 80.

In some embodiments, the pivot link member 86 is a single, monolithic piece. In some embodiments, the pivot link member 86 includes a machined part. In some embodiments, the pivot link member 86 includes a molded part. In some embodiments, the pivot link member 86 includes a plastic material. In some embodiments, the pivot link member 86 includes metal, such as steel or aluminum.

In operation, the pivot link member 86 pivots at the back pivot aperture 130 to laterally move the second end 140 of the pivot link member 86, from side to side, in an arcuate lateral movement of the second end 140. The bottom side 118 of the guide plate member 84 is positioned on a mounting plate 206. In some embodiments, the mounting plate 206 is part of the arm pad support 70. In some embodiments, the mounting plate 206 is a separate piece attached to the arm pad support 70.

The mounting plate 206, as shown in FIG. 6, includes a pivot boss 208, a slot boss 210, and a latch slot 212. The pivot boss 208 includes an aperture 208*a* that receives the screw 162 and the slot boss 210 includes an aperture 210*a* that receives the screw 176. The guide plate member 84 is situated on the mounting plate 206 with the pivot aperture 100 placed over the pivot boss 208 and the slot aperture 102 placed over the slot boss 210. The latch slot 212 receives the latch 106 of the guide plate member 84 to hold the guide plate member 84 in place.

Next, the bottom side 148 of the pivot link member 86 is positioned on the top side 116 of the guide plate member 84. The smaller diameter Dia1 of the back pivot aperture 130 at the bottom side 148 of the pivot link member 86 is positioned over the pivot boss 208 and the smaller length Ls1 and width Ws1 of the first curved slot 134 at the bottom side 148 of the pivot link member 86 is position over the slot boss 210. The pocket 152 receives the fastener element 156 and the screw 162 is tightened into the pivot boss 208. The kidney shaped pocket 166 receives the fastener element 170 and the screw 176 is tightened into the slot boss 210. The screws 162 and 176 are tightened to provide a friction fit, such that the pivot link member 86 slides on the guide plate member 84 as the pivot link member 86 pivots at the back pivot aperture 130 and laterally moves the second end 140. The pivot link member 86 rotates at the back pivot aperture 130 to rotate or laterally move the second end 140 in an arcuate lateral movement of the second end 140 based on rotation of the pivot link member 86 at the back pivot aperture 130. Sides of the first curved slot 134 at the bottom side 148 knock against the slot boss 210 to terminate lateral movement of the second end 140, and the detent bump 204 slides out of and into the detent aperture 104 of the guide plate member 84 to indicate a home position with the pivot link member 86 and the guide plate member 84 straight in line with one another.

Figure 9A:
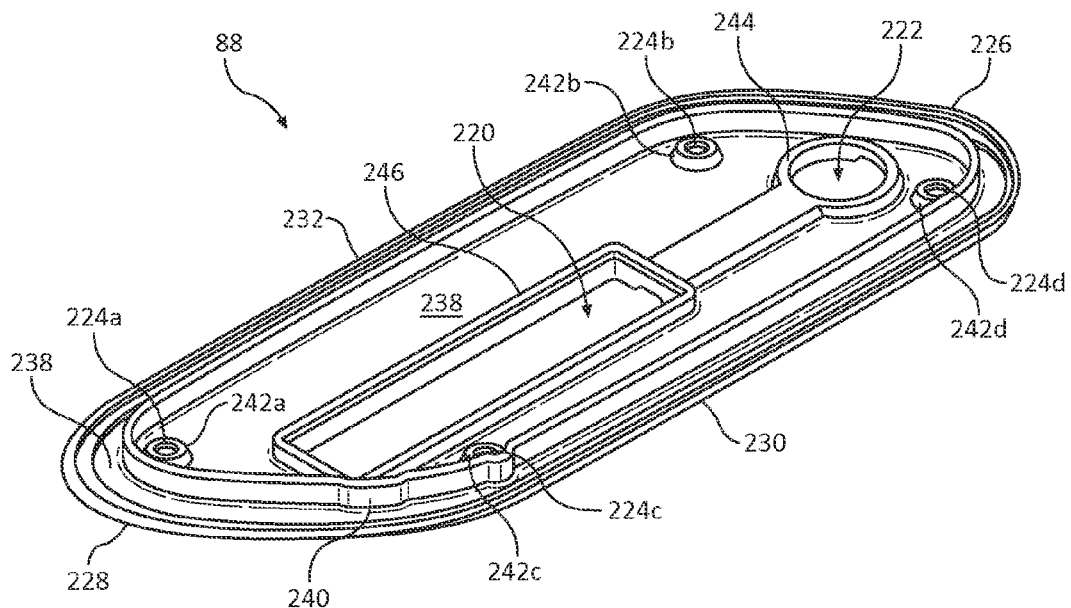
FIG. 9A is a diagram illustrating a top perspective view of a cover plate member, according to some embodiments.
Figure 9B:
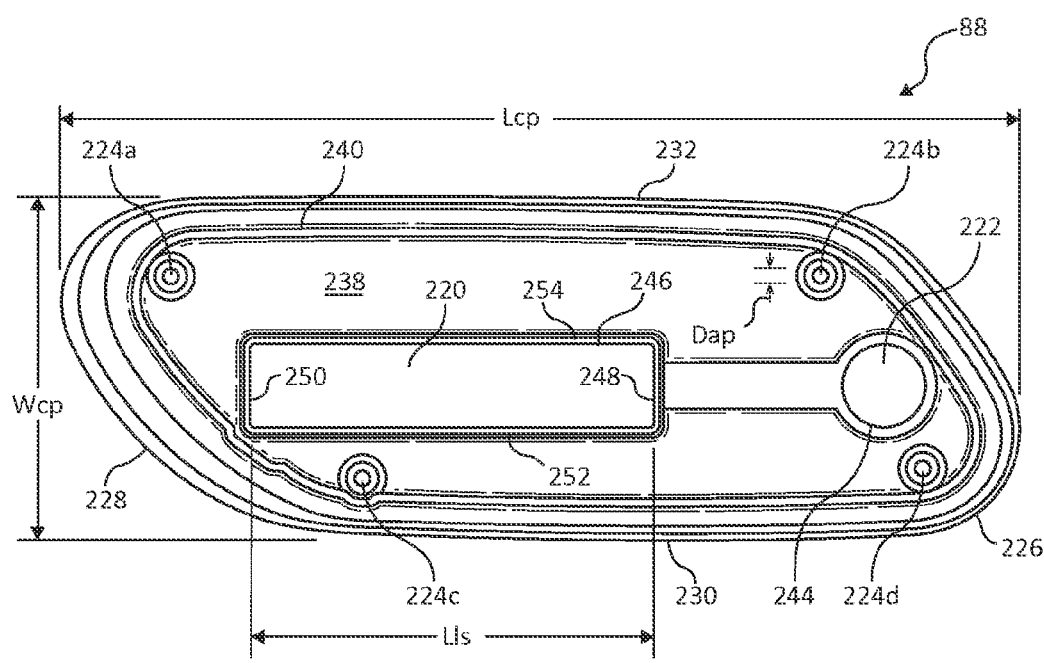
FIG. 9B is a diagram illustrating a top view of the cover plate member, according to some embodiments.
Figure 9C:
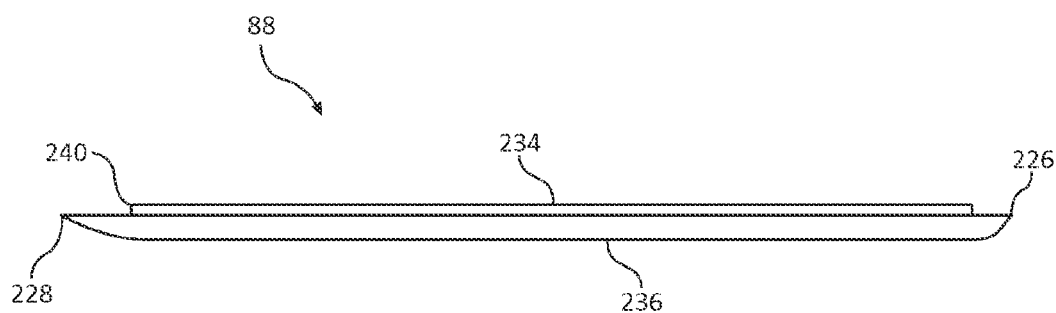
FIG. 9C is a diagram illustrating a side view of the cover plate member, according to some embodiments.
Figure 9D:
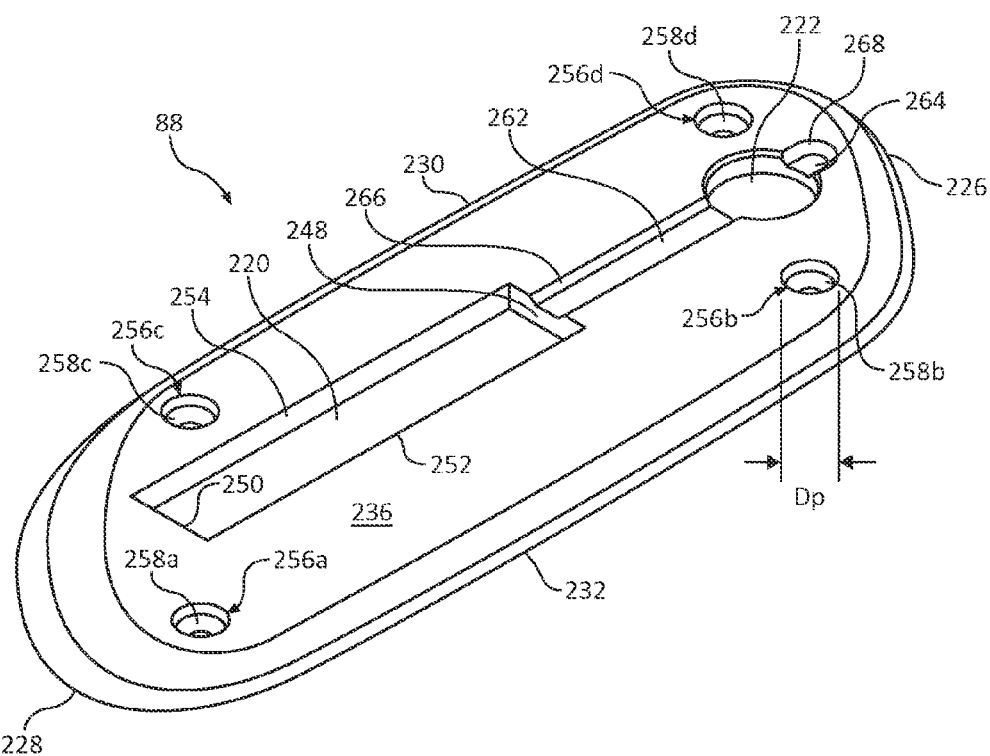
FIG. 9D is a diagram illustrating a bottom perspective view of the cover plate member, according to some embodiments.

FIGS. 9A-9D are diagrams illustrating the cover plate member 88, according to some embodiments described in the disclosure. FIG. 9A is a diagram illustrating a top perspective view of the cover plate member 88, according to some embodiments, and FIG. 9B is a diagram illustrating a top view of the cover plate member 88, according to some embodiments. FIG. 9C is a diagram illustrating a side view of the cover plate member 88, according to some embodiments. FIG. 9D is a diagram illustrating a bottom perspective view of the cover plate member 88, according to some embodiments.

The cover plate member 88 is a rounded corner parallelogram shaped member including a longitudinal slot 220, a fastener access aperture 222, and arm pad mounting apertures 224*a*-224*d*. The cover plate member 88 has a length Lcp from a back or first end 226 to a front or second end 228, a width Wcp from a left or first side 230 to a right or second side 232, and a depth Dcp from a top side 234 to a bottom side 236. In some embodiments, the cover plate member 88 is larger than each of the pivot link member 86 and the guide plate member 84, such that the length Lcp is greater than each of the lengths L2 and L1, respectively, and the width Wcp is greater than each of the widths W2 and W1, respectively. In some embodiments, the cover plate member 88 is substantially the same or smaller in length and/or width than at least one of the pivot link member 86 and the guide plate member 84. In some embodiments, the cover plate member 88 is a different shape.

The cover plate member 88 includes a recessed portion 238 that defines a cover plate rim 240, arm pad mounting platforms 242*a*-242*d*, an access aperture rim 244, and a longitudinal slot rim 246. The cover plate rim 240 protrudes from the recessed portion 238 and provides a border around at least part of the recessed portion 238. The arm pad mounting platforms 242*a*-242*d* are coplanar platforms that protrude from the recessed portion 238 and are situated below the cover plate rim 240 for mounting the arm pad 80 to the arm pad assembly 72. The access aperture rim 244 protrudes from the recessed portion 238 and provides a border around the fastener access aperture 222. The longitudinal slot rim 246 protrudes from the recessed portion 238 and extends around the longitudinal slot 220 to provide a border around the longitudinal slot 220.

The longitudinal slot 220 is a rectangular shaped through hole from the top side 234 through the bottom side 236. The longitudinal slot 220 is situated toward the second end 228 and the second side 232 and extends along the length Lcp. The longitudinal slot 220 has a slot length L1s from a first slot end 248 to a second slot end 250, and a slot width W1s from a first slot side 252 to a second slot side 254. The longitudinal slot rim 246 extends around the longitudinal slot 220 to provide a border at the first slot end 248, the second slot end 250, the first slot side 252, and the second slot side 254. The slide block member 90 fits into the longitudinal slot 220 between the first slot side 252 and the second slot side 254 and onto the longitudinal slot rim 246 on the first slot side 252 and the second slot side 254, such that the cover plate member 88 slides longitudinally between the pivot link member 86 and the slide block member 90. The slide block member 90 knocks against the first slot end 248 and the second slot end 250 to terminate longitudinal sliding of the cover plate member 88.

The fastener access aperture 222 is a circular through hole from the top side 234 through the bottom side 236. The fastener access aperture 222 is situated in line with the longitudinal slot 220 along the length Lcp of the cover plate member 88 and closer to the first end 226 than the longitudinal slot 220. The access aperture rim 244 provides a border around the fastener access aperture 222. The fastener access aperture 244 provides access to the fastener element 156 for attaching the guide plate member 84 and the pivot link member 86 to the arm pad support 70. In some embodiments, the fastener access aperture 222 has a different shape.

The arm pad mounting apertures 224*a*-224*d* are circular through holes that extend through the top side 234 and the bottom side 236. The arm pad mounting platforms 242*a*-242*d* extend around the arm pad mounting apertures 224*a*-224*d*, respectively, at the top side 234. The arm pad mounting apertures 224*a*-224*d* include pockets 256*a*-256*d*, respectively, at the bottom side 236. The pockets 256*a*-256*d* define ledges 258*a*-258*d*, respectively. Each of the pockets 256*a*-256*d* has a diameter Dp that is greater than the diameter Dap of each of the arm pad mounting apertures 224*a*-224*d* at the top side 234. To attach the arm pad 80 to the arm pad assembly 72, each of the pockets 256a-256d receives one of the arm pad fasteners 260a-260d, such as a screw, as shown in FIG. 6.

The cover plate member 88 further includes an indented detent slot 262 and an indented detent tab 264 on the bottom side 236. The detent slot 262 is rectangular and extends from the fastener access aperture 222 to the longitudinal slot 220. The detent tab 264 is part of a racetrack oval shape and extends toward the first end 226 from the fastener access aperture 222. The detent slot 262 includes beveled edges 266 and the detent tab 264 includes beveled edges 268. The detent slot 262 and the detent tab 264 receive the detent bumps 200 and 204 of the pivot link member 86 to indicate a home position between the pivot link member 86 and the cover plate member 88. The bottom side 236 of the cover plate member 88 is flat, except for the pockets 256a-256d, the detent slot 262, and the detent tab 264.

In some embodiments, the cover plate member 88 is a single, monolithic piece. In some embodiments, the cover plate member 88 includes a machined part. In some embodiments, the cover plate member 88 includes a molded part. In some embodiments, the cover plate member 88 includes a plastic material. In some embodiments, the cover plate member 88 includes metal, such as steel or aluminum.

Figure 10A:
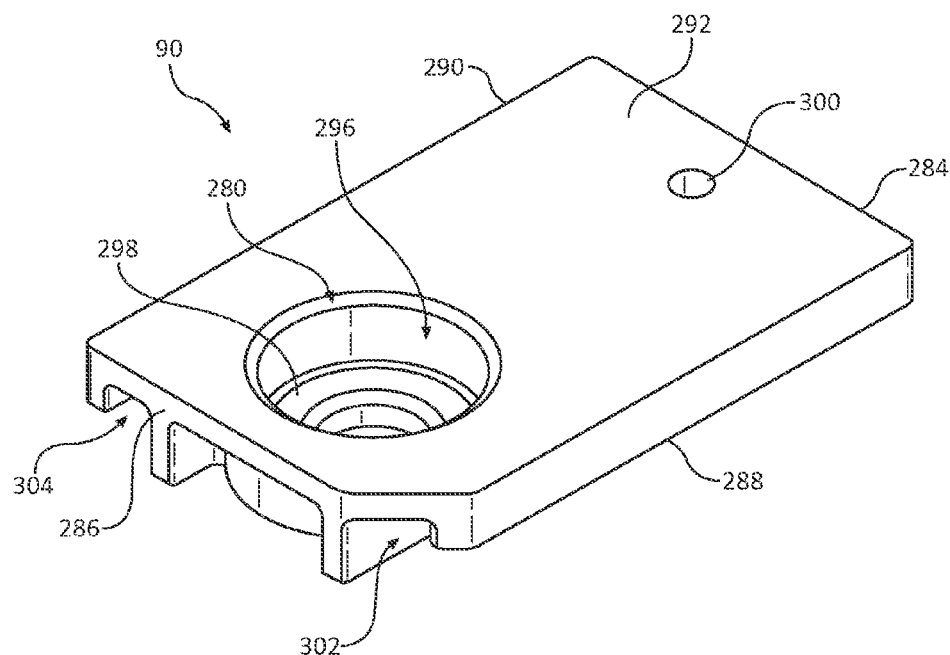
FIG. 10A is a diagram illustrating a top perspective view of a slide block member, according to some embodiments.
Figure 10B:
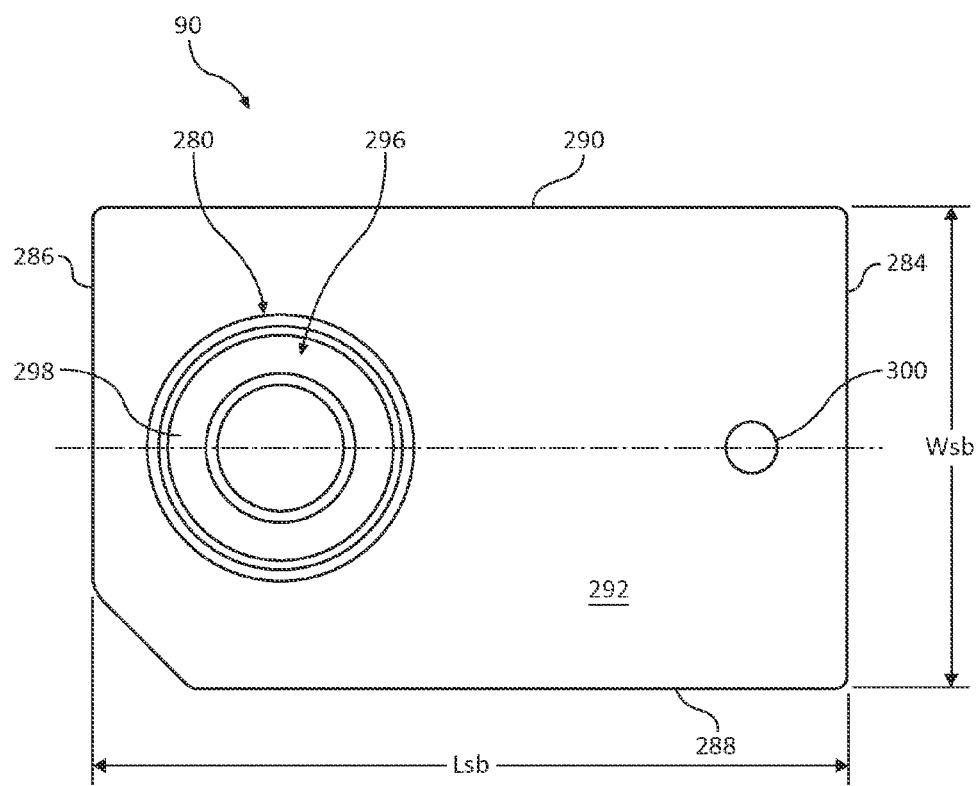
FIG. 10B is a diagram illustrating a top view of the slide block member, according to some embodiments.
Figure 10C:
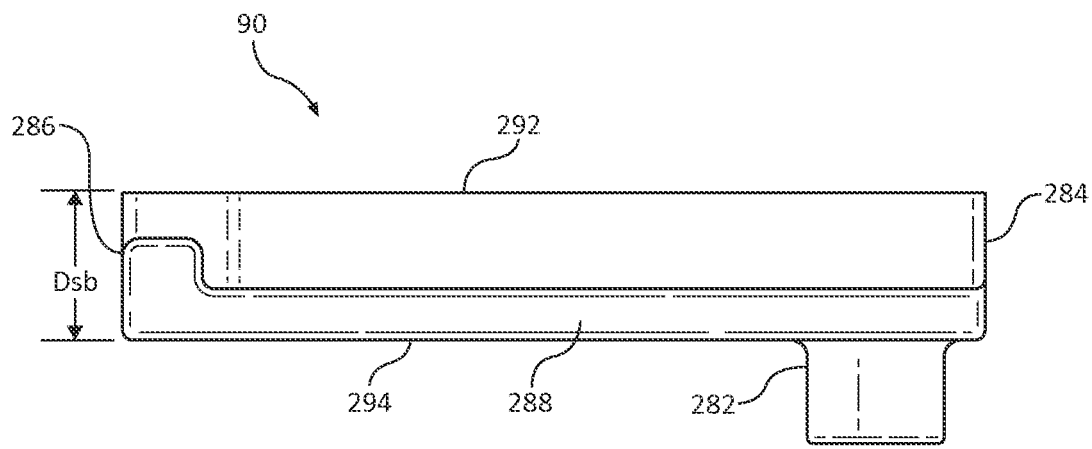
FIG. 10C is a diagram illustrating a side view of the slide block member, according to some embodiments.
Figure 10D:
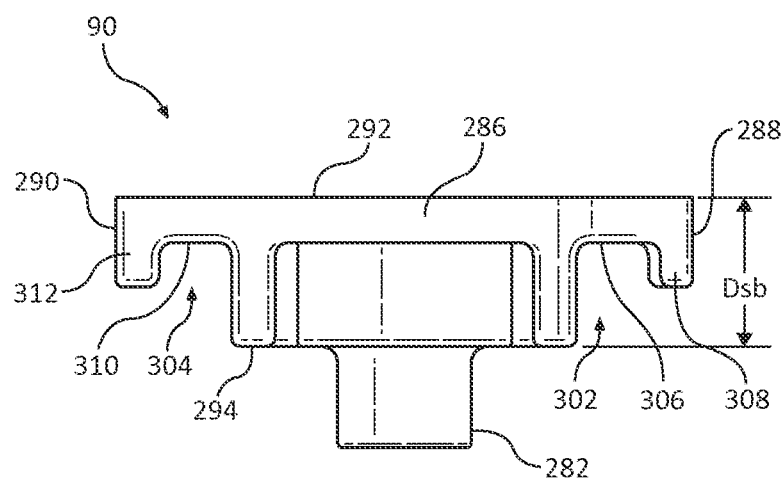
FIG. 10D is a diagram illustrating an end view of the slide block member, according to some embodiments.
Figure 10E:
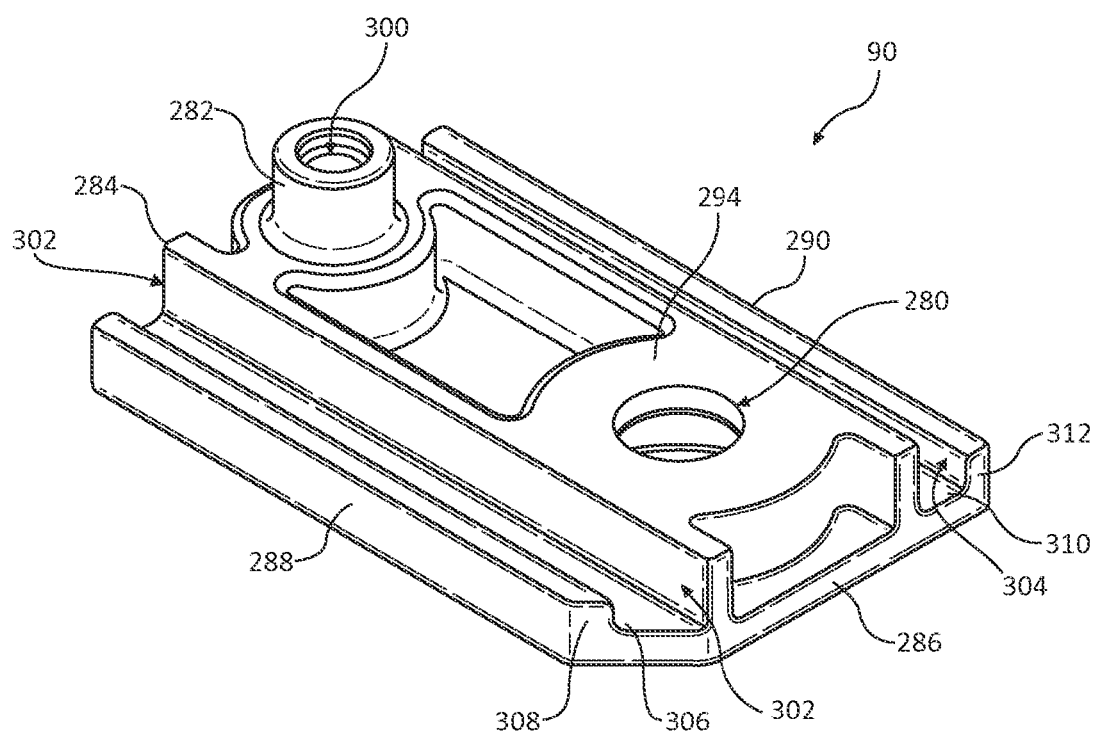
FIG. 10E is a diagram illustrating a bottom perspective view of the slide block member, according to some embodiments.

FIGS. 10A-10E are diagrams illustrating the slide block member 90, according to some embodiments described in the disclosure. FIG. 10A is a diagram illustrating a top perspective view of the slide block member 90, according to some embodiments, and FIG. 10B is a diagram illustrating a top view of the slide block member 90, according to some embodiments. FIG. 10C is a diagram illustrating a side view of the slide block member 90, according to some embodiments, and FIG. 10D is a diagram illustrating an end view of the slide block member 90, according to some embodiments. FIG. 10E is a diagram illustrating a bottom perspective view of the slide block member 90, according to some embodiments.

The slide block member 90 is substantially cuboid shaped, having a rectangular two-dimensional shape. The slide block member 90 includes a block aperture 280 and a block boss 282. The slide block member 90 has a length Lsb from a back or first end 284 to a front or second end 286, a width Wsb from a left or first side 288 to a right or second side 290, and a depth Dsb from a top side 292 to a bottom side 294 of the slide block member 90. In some embodiments, the slide block member 90 has a different shape.

At the top side 292, the block aperture 280 includes a pocket 296 that defines a ledge 298. The block aperture 280 is a through hole that extends through the top side 292 and the bottom side 294. In some embodiments, one or more of the block aperture 280 and the pocket 296 has a circular shape. In some embodiments, one or more of the block aperture 280 and the pocket 296 has a different shape, such as rectangular or hexagonal.

The block boss 282 protrudes from the bottom side 294 and includes a block boss aperture 300 that is a through hole that extends through the bottom of the block boss 282 and the top side 292. In some embodiments, the block boss 282 is circular shaped. In some embodiments, the block boss aperture 300 is circular shaped. In some embodiments, one or more of the block boss 282 and the block boss aperture 300 has a different shape, such as rectangular or hexagonal. In some embodiments, the block boss aperture 300 is not a through hole, but only extends from the bottom of the block boss 282 and into the block boss 282.

At the bottom side 294, the slide block member 90 includes a first longitudinal slot 302 and a second longitudinal slot 304. The first longitudinal slot 302 includes a first recessed portion 306 and a first railing 308 that protrudes from the first recessed portion 306 to define the first longitudinal slot 302. The first longitudinal slot 302, including the first recessed portion 306 and the first railing 308, extends from the first end 284 to the second end 286. The second longitudinal slot 304 includes a second recessed portion 310 and a second railing 312 that protrudes from the second recessed portion 310 to define the second longitudinal slot 304. The second longitudinal slot 304, including the second recessed portion 310 and the second railing 312, extends from the first end 284 to the second end 286.

In some embodiments, to assemble the arm pad assembly 72, the bottom side 294 of the slide block member 90 is fit into and inserted into the longitudinal slot 220 of the cover plate member 88. The first longitudinal slot 302 of the slide block member 90 is fit over the longitudinal slot rim 246 along the first slot side 252 and the second longitudinal slot 304 of the slide block member 90 is fit over the longitudinal slot rim 246 along the second slot side 254. The first recessed portion 306 is positioned on the longitudinal slot rim 246 along the first slot side 252 and the second recessed portion 310 is positioned on the longitudinal slot rim 246 along the second slot side 254. The block boss 282 is positioned closer to the first slot end 248 and the block aperture 280 is positioned closer to the second slot end 250.

Next, the block boss 282 is fit into and inserted into the second curved slot 136 at the top side 146 of the pivot link member 86 and the block aperture 280 fit over the front pivot boss 132 of the pivot link member 86. The fastener element 180 including the first washer 182, the second washer 184, and the screw 186, shown in FIG. 6, is received by the pocket 296 and the screw 186 is passed through the block aperture 280 and tightened into the front pivot boss 132. Next, the kidney shaped pocket 188 of the second curved slot 136 receives the fastener element 192 including the first washer 194, the second washer 196, and the screw 198 that is tightened into the block boss 282. The screws 186 and 198 are tightened to provide a friction fit between the top side 146 of the pivot link member 86 and the bottom side 236 of the cover plate member 88. The cover plate member 88 slides on the pivot link member 86 as the slide block member 90 and the cover plate member 88 pivot at the front pivot boss 132 and laterally move the first end 284 of the slide block member 90 and the first end 226 of the cover plate member 88. The first end 284 of the slide block member 90 and the first end 226 of the cover plate member 88 move in an arcuate lateral movement as the slide block member 90 and the cover plate member 88 rotate or pivot at the front pivot boss 132. Sides of the second curved slot 136 at the top side 146 knock against the block boss 282 to stop lateral movement of the slide block member 90 and the cover plate member 88. The detent slot 262 and the detent tab 264 of the cover plate member 88 receive the detent bumps 200 and 202 of the pivot link member 86 to indicate a home position between the pivot link member 86 and the cover plate member 88.

To further the assembly of the arm pad assembly 72, the cover plate member 88 is slid to a forward position with the fastener access aperture 222 positioned over the back pivot aperture 130 to provide access to the fastener element 156. The cover plate member 88 is slid to a rearward position with the longitudinal slot 220 positioned over the first curved slot 134 to provide access to the fastener element 170. As previously described, the bottom side 118 of the guide plate member 84 is positioned on the mounting plate 206 with the pivot aperture 100 placed over the pivot boss 208 and the slot aperture 102 placed over the slot boss 210. The latch slot 212 receives the latch 106 of the guide plate member 84 to hold the guide plate member 84 in place.

Next, the bottom side 148 of the pivot link member 86 is positioned on the top side 116 of the guide plate member 84. The smaller diameter Dia1 of the back pivot aperture 130 is positioned over the pivot boss 208 and the smaller length Ls1 and width Ws1 of the first curved slot 134 is positioned over the slot boss 210. The pocket 152 receives the fastener element 156 and the screw 162 is tightened into the pivot boss 208. The kidney shaped pocket 166 receives the fastener element 170 and the screw 176 is tightened into the slot boss 210. The screws 162 and 176 are tightened to provide a friction fit, such that the pivot link member 86 slides on the guide plate member 84 as the pivot link member 86 pivots at the back pivot aperture 130 and laterally moves the second end 140 in an arcuate lateral movement. Sides of the first curved slot 134 at the bottom side 148 knock against the slot boss 210 to terminate or stop lateral movement of the second end 140, and the detent bump 204 slides out of and into the detent aperture 104 of the guide plate member 84 to indicate a home position with the pivot link member 86 and the guide plate member 84 straight in line with one another.

Figure 11A:
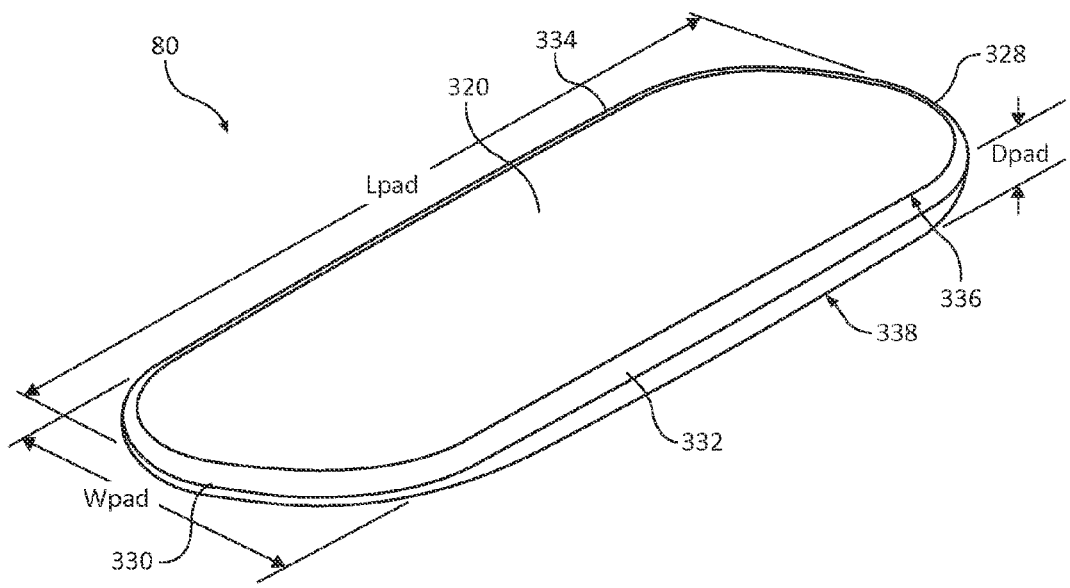
FIG. 11A is a diagram illustrating a top perspective view of the arm pad, according to some embodiments.
Figure 11B:
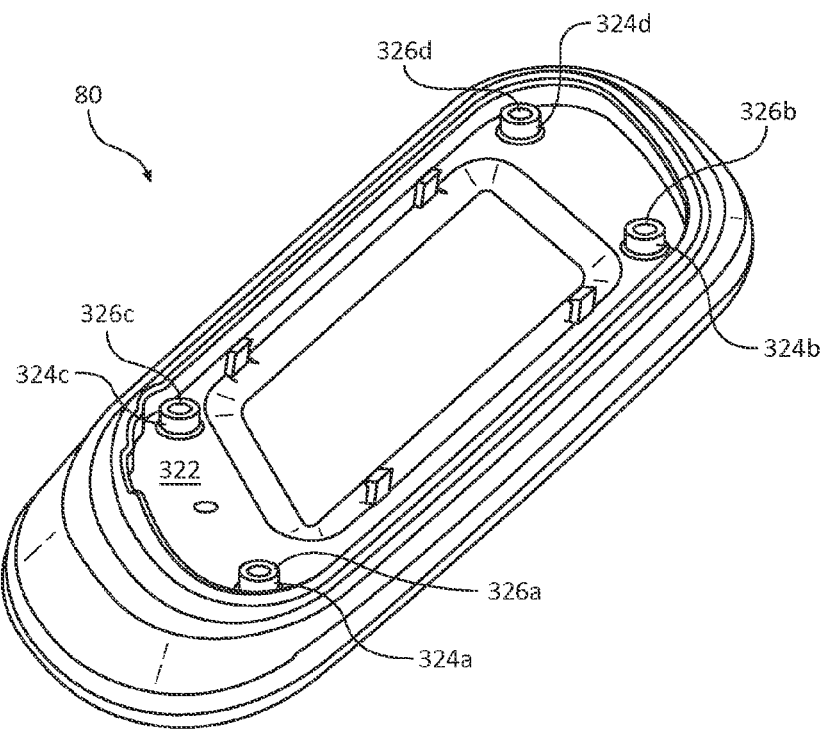
FIG. 11B is a diagram illustrating a bottom perspective view of the arm pad, according to some embodiments.

FIGS. 11A and 11B are diagrams illustrating the arm pad 80, according to some embodiments described in the disclosure. FIG. 11A is a diagram illustrating a top perspective view of the arm pad 80, according to some embodiments, and FIG. 11B is a diagram illustrating a bottom perspective view of the arm pad 80, according to some embodiments.

The arm pad 80 is a rounded corner parallelogram shaped member including a cover a cover pad 320, a bottom recessed portion 322, and fastener bosses 324a-324d that include corresponding fastener apertures 326a-326d. The fastener bosses 324a-324d are coplanar and protrude from the bottom recessed portion 322. The arm pad 80 has a length Lpad from a back or first end 328 to a front or second end 330, a width Wpad from a left or first side 332 to a right or second side 334, and a depth Dpad from a top side 336 to a bottom side 338. In some embodiments, the arm pad 80 is larger than each of the cover plate member 88, the pivot link member 86, and the guide plate member 84. In some embodiments, the arm pad 80 is substantially the same or smaller in length and/or width than at least one of the cover plate member 88, the pivot link member 86, and the guide plate member 84. In some embodiments, the arm pad 80 is a different shape.

To further complete assembly of the arm pad assembly 72. The cover plate member 88 is slid to expose the arm pad mounting apertures 224a-224d including the pockets 256a-256d. The arm pad mounting platforms 242a-242d are aligned with the corresponding fastener bosses 324a-324d and each of the arm pad mounting apertures 224a-224d receives one of the arm pad fasteners 260a-260d, shown in FIG. 6, which are tightened into the fastener bosses 324a-324d.

Figures 12A, 12B:
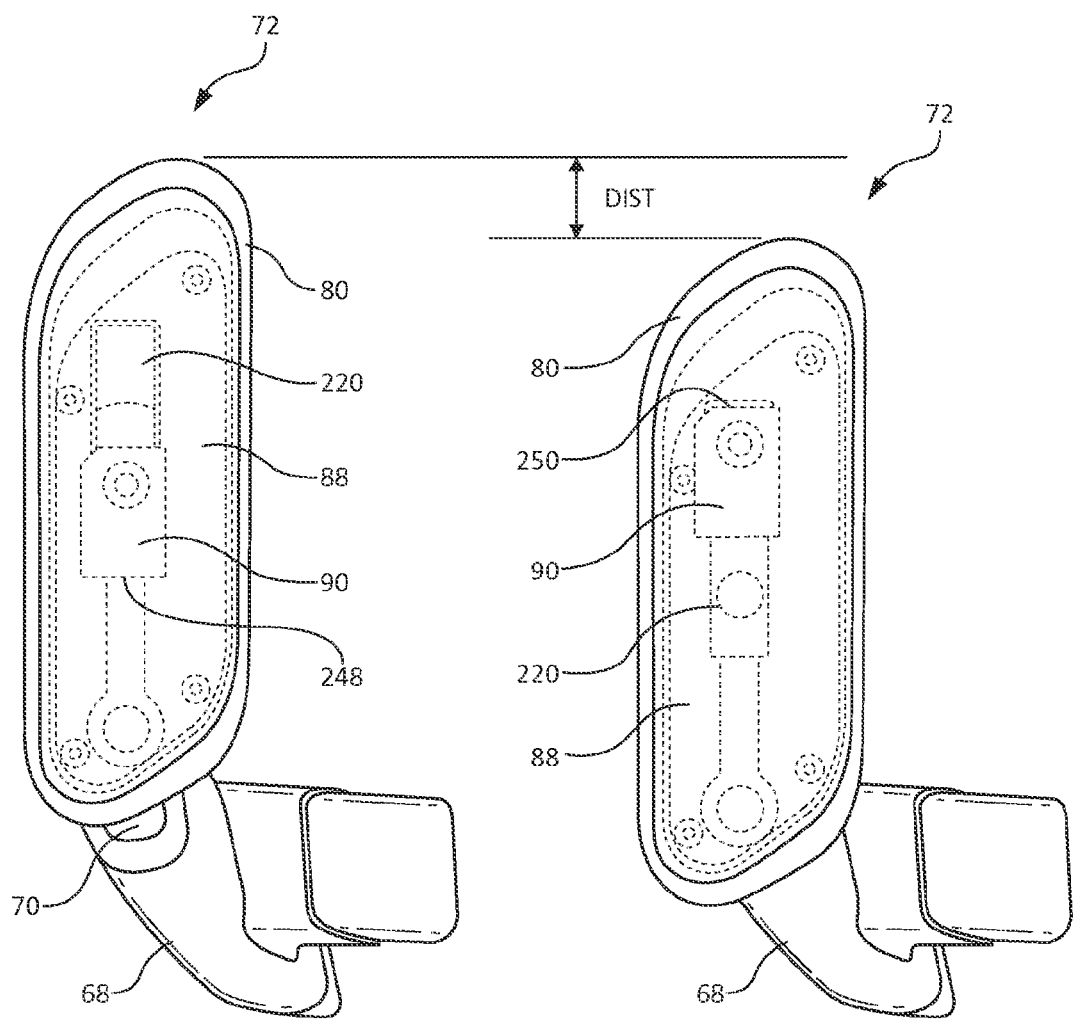
FIG. 12A is a diagram illustrating the arm pad assembly with the cover plate member and the arm pad in the forward position, according to some embodiments.
FIG. 12B is a diagram illustrating the arm pad assembly with the cover plate member and the arm pad in the rearward position, according to some embodiments.

FIGS. 12A and 12B are diagrams illustrating the forward and backward or rearward sliding motion of the arm pad assembly 72, according to some embodiments described in the disclosure. FIGS. 12A and 12B are semi-transparent views of the arm pad assembly 72 attached to the arm pad support 70, which is attached to the armrest support 68. In the arm pad assembly 72, the cover plate member 88 slides forward and backward between the pivot link member 86 and the slide block member 90. The arm pad 80, which is securely attached to the cover plate member 88, moves with the cover plate member 88 to adjust support for the arm of the user.

FIG. 12A is a diagram illustrating the arm pad assembly 72 with the cover plate member 88 and the arm pad 80 in the forward position, according to some embodiments. The cover plate member 88 is slid forward, such that the slide block member 90 is positioned toward or at the first slot end 248 of the longitudinal slot 220. This moves the arm pad 80 into the forward position.

FIG. 12B is a diagram illustrating the arm pad assembly 72 with the cover plate member 88 and the arm pad 80 in the rearward position, according to some embodiments. The cover plate member 88 is slid backward or rearward, such that the slide block member 90 is positioned toward or at the second slot end 250 of the longitudinal slot 220. This moves the arm pad 80 into the rearward position, which is a distance Dist behind the arm pad 80 in the forward position.

Figures 13A, 13B:
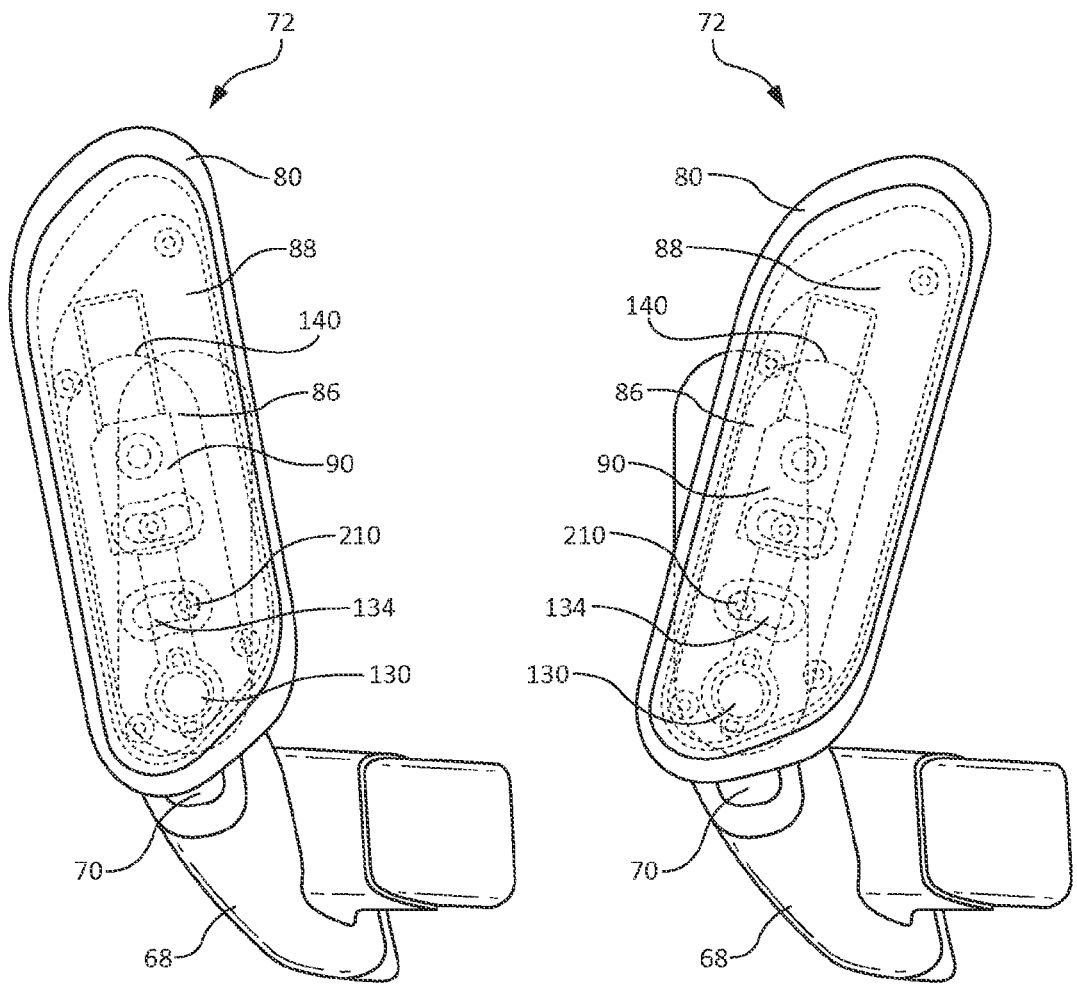
FIG. 13A is a diagram illustrating the arm pad assembly in the rotated out position, according to some embodiments.
FIG. 13B is a diagram illustrating the arm pad assembly in the rotated in position, according to some embodiments.

FIGS. 13A and 13B are diagrams illustrating rotation of the arm pad assembly 72 at the back pivot aperture 130 of the pivot link member 86, according to some embodiments described in the disclosure. FIGS. 13A and 13B are semi-transparent views of the arm pad assembly 72 attached to the arm pad support 70, which is attached to the armrest support 68. The pivot link member 86 pivots at the back pivot aperture 130 to laterally move the second end 140 of the pivot link member 86 in an arcuate lateral movement. The slide block member 90 is attached to the pivot link member 86 toward the second end 140 and moves with the second end 140. The cover plate member 88 is engaged between the pivot link member 86 and the slide block member 90, such that the cover plate member 88 moves with the slide block member 90. The arm pad 80, which is securely attached to the cover plate member 88, moves with the cover plate member 88 to adjust support for the arm of the user.

FIG. 13A is a diagram illustrating the arm pad assembly 72 in the rotated out position, such that the second end 140 of the pivot link member 86 has laterally moved to the left, outward and away from the armrest support 68, according to some embodiments. The pivot link member 86 pivots at the first pivot aperture 130 such that the right side of the first curved slot 134 moves closer to the slot boss 210. The right side of the first curved slot 134 knocks against the slot boss 210 to stop the pivoting action of the pivot link member 86. The cover plate member 88 and arm pad 80 move with the slide block member 90 to the rotated out position of the second end 140 of the pivot link member 86.

FIG. 13B is a diagram illustrating the arm pad assembly 72 in the rotated in position, such that the second end 140 of the pivot link member 86 has laterally moved to the right, inward and toward the armrest support 68, according to some embodiments. The pivot link member 86 pivots at the first pivot aperture 130 such that the left side of the first curved slot 134 moves closer to the slot boss 210. The left side of the first curved slot 134 knocks against the slot boss 210 to stop the pivoting action of the pivot link member 86. The cover plate member 88 and arm pad 80 move with the slide block member 90 to the rotated in position of the second end 140 of the pivot link member 86.

Figures 14A, 14B:
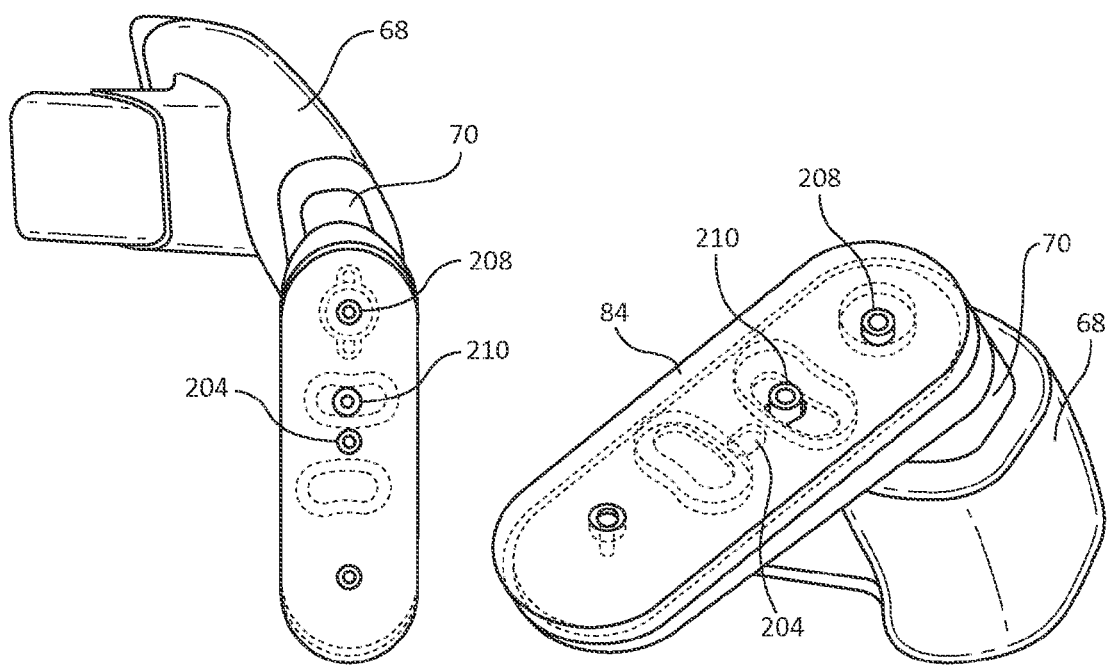
FIGS. 14A and 14B are diagrams illustrating the pivot link member and the guide plate member in the home position, according to some embodiments.

FIGS. 14A and 14B are diagrams illustrating the pivot link member 86 and the guide plate member 84 in the home position, according to some embodiments described in the disclosure. FIGS. 14A and 14B are semi-transparent views illustrating the pivot link member 86 and the guide plate member 84 on the arm pad support 70, which is attached to the armrest support 68.

As previously described, the guide plate member 84 is positioned on the mounting plate 206 with the pivot aperture 100 placed over the pivot boss 208 and the slot aperture 102 placed over the slot boss 210. Also, the bottom side 148 of the pivot link member 86 is positioned on the top side 116 of the guide plate member 84, and the smaller diameter Dia1 of the back pivot aperture 130 is positioned over the pivot boss 208 and the smaller length Ls1 and width Ws1 of the first curved slot 134 is positioned over the slot boss 210.

The detent bump 204 slides in and out of the detent aperture 104 of the guide plate member 84 to indicate a home position with the pivot link member 86 and the guide plate member 84 in the straight forward (home) position. The detent bump 204 and detent aperture 104 give the user positive feedback that the pivot link member 86 and the guide plate member 84 are in the straight forward (home) position on the armrest 50.

Figures 15A, 15B:
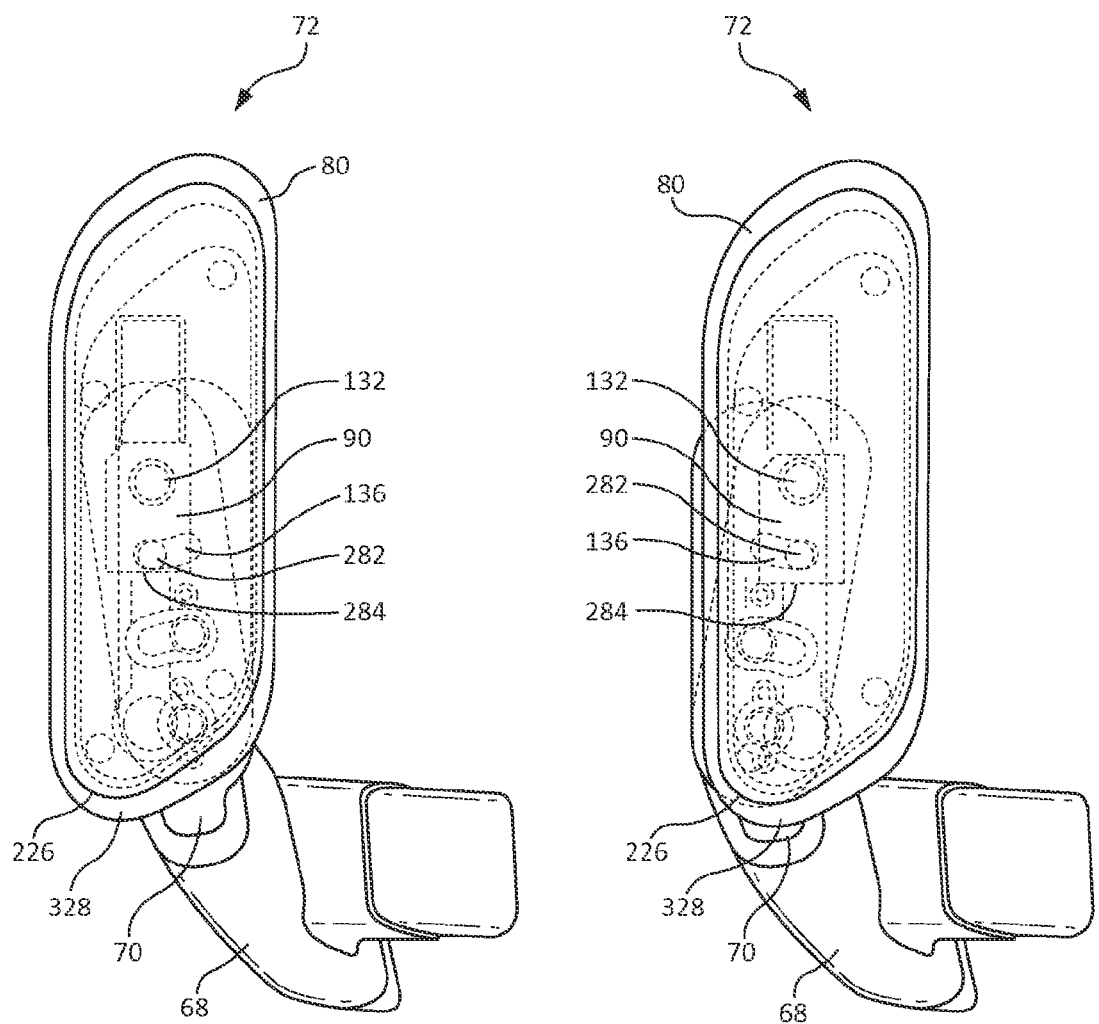
FIG. 15A is a diagram illustrating the arm pad assembly in a rotated out position, such that the first end of the cover plate member and the arm pad have laterally moved to the left, according to some embodiments.
FIG. 15B is a diagram illustrating the arm pad assembly in a rotated in position, such that the first end of the cover plate member and the arm pad have laterally moved to the right, according to some embodiments.

FIGS. 15A and 15B are diagrams illustrating rotation of the arm pad assembly 72 at the front pivot boss 132 of the pivot link member 86, according to some embodiments described in the disclosure. FIGS. 15A and 15B are semi-transparent views of the arm pad assembly 72 attached to the arm pad support 70, which is attached to the armrest support 68. In the arm pad assembly 72, the slide block member 90 pivots at the front pivot boss 132 to laterally move the first end 284 of the slide block member 90 and the first end 226 of the cover plate member 88 in an arcuate lateral movement. The arm pad 80, which is securely attached to the cover plate member 88, moves with the cover plate member 88 to adjust support for the arm of the user.

FIG. 15A is a diagram illustrating the arm pad assembly 72 in the rotated out position, such that the first end 226 of the cover plate member 88 and the first end 328 of the arm pad 80 have laterally moved to the left, outward and away from the armrest support 68, according to some embodiments. The slide block member 90 pivots at the front pivot boss 132 and moves the position of the block boss 282 in the second curved slot 136 to the left side of the second curved slot 136. The first end 284 of the slide block member 90 and the first end 226 of the cover plate member 88 rotate to the left, outward and away from the armrest support 68. The block boss 282 knocks up against the left side of the second curved slot 136 to stop the pivoting action of the slide block member 90. The arm pad 80, which is securely attached to the cover plate member 88, moves with the cover plate member 88 to adjust support for the arm of the user.

FIG. 15B is a diagram illustrating the arm pad assembly 72 in the rotated in position, such that the first end 226 of the cover plate member 88 and the first end 328 of the arm pad 80 have laterally moved to the right, inward and toward the armrest support 68, according to some embodiments. The slide block member 90 pivots at the front pivot boss 132 and moves the position of the slide block boss 282 in the second curved slot 136 to the right side of the second curved slot 136. The first end 284 of the slide block member 90 and the first end 226 of the cover plate member 88 rotate to the right, inward and toward the armrest support 68. The block boss 282 knocks up against the right side of the second curved slot 136 to stop the pivoting action of the slide block member 90. The arm pad 80, which is securely attached to the cover plate member 88, moves with the cover plate member 88 to adjust support for the arm of the user.

Figures 16A, 16B:
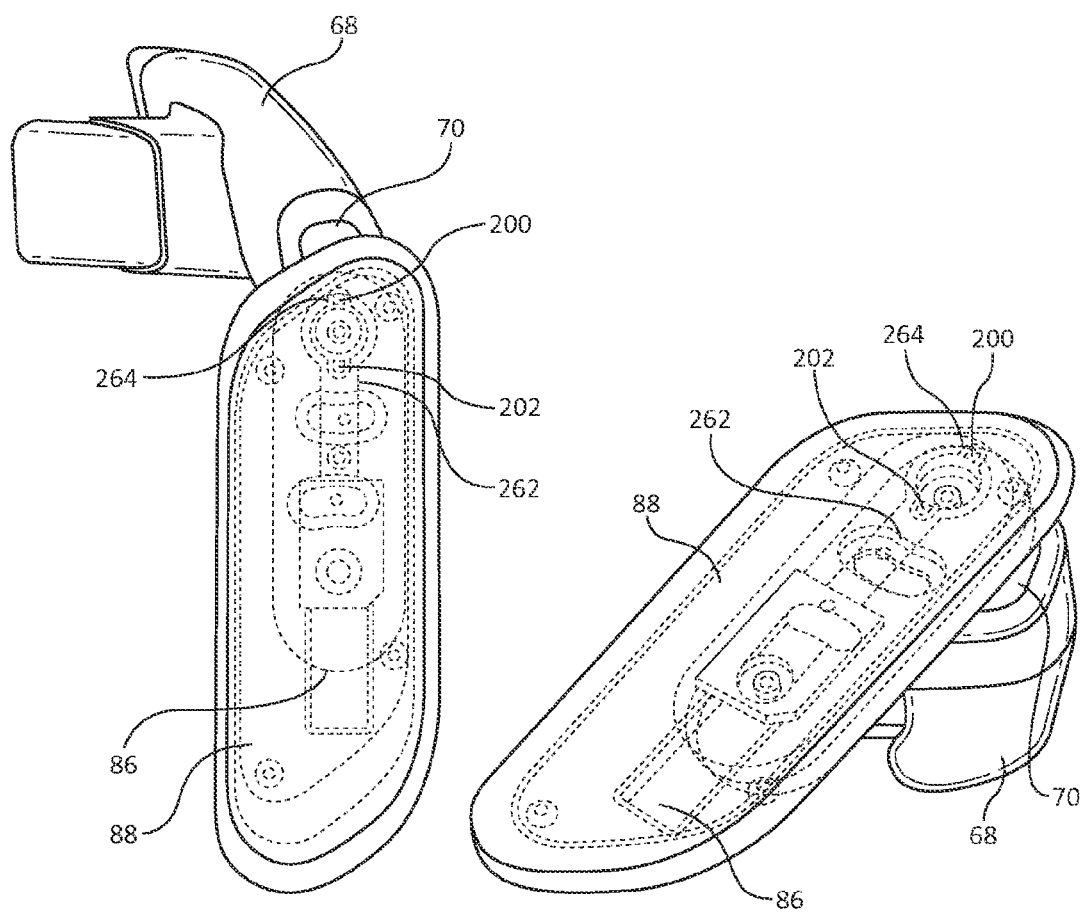
FIGS. 16A and 16B are diagrams illustrating the cover plate member and the pivot link member in the home position, according to some embodiments.

FIGS. 16A and 16B are diagrams illustrating the cover plate member 88 and the pivot link member 86 in the home position, according to some embodiments described in the disclosure. FIGS. 16A and 16B are semi-transparent views illustrating the cover plate member 88 and the pivot link member 86 on the arm pad support 70, which is attached to the armrest support 68.

As previously described the cover plate member 88 rotates on the pivot link member 86 as the slide block member 90 and the cover plate member 88 pivot at the front pivot boss 132 and laterally move the first end 284 of the slide block member 90 and the first end 226 of the cover plate member 88 in an arcuate lateral movement. Sides of the second curved slot 136 at the top side 146 knock against the block boss 282 to stop lateral movement of the slide block member 90 and the cover plate member 88. The detent slot 262 and the detent tab 264 of the cover plate member 88 receive the detent bumps 200 and 202 of the pivot link member 86 to indicate a straight forward (home) position of the pivot link member 86 and the cover plate member 88. This gives the user positive feedback that the pivot link member 86 and the cover plate member 88 are in the forward home position.

Figure 17:
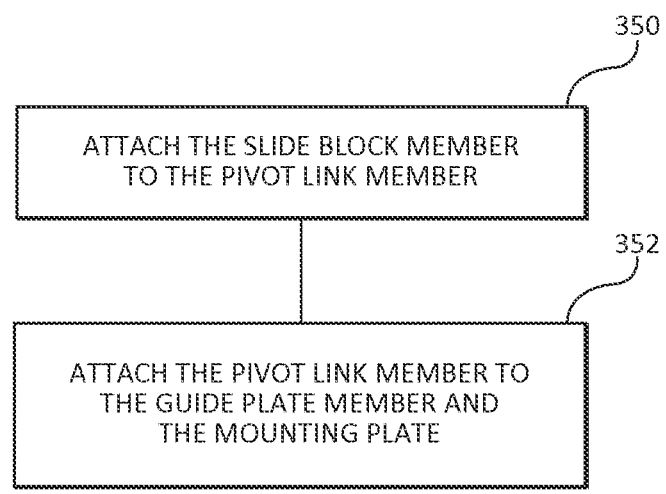
FIG. 17 is a flow chart diagram illustrating a method of assembling the arm pad assembly, according to some embodiments.

FIG. 17 is a flow chart diagram illustrating a method of assembling the arm pad assembly 72, according to some embodiments described in the disclosure. At 350, the slide block member 90 is attached to the pivot link member 86 at the front pivot boss 132 to pivot the slide block member 90 at the front pivot boss 132 and laterally move at least the first end 284 of the slide block member 90 in an arcuate lateral movement.

The bottom side 294 of the slide block member 90 is fit into and inserted into the longitudinal slot 220 of the cover plate member 88. The first longitudinal slot 302 of the slide block member 90 is fit over the longitudinal slot rim 246 along the first slot side 252 and the second longitudinal slot 304 of the slide block member 90 is fit over the longitudinal slot rim 246 along the second slot side 254. The first recessed portion 306 is positioned on the longitudinal slot rim 246 along the first slot side 252 and the second recessed portion 310 is positioned on the longitudinal slot rim 246 along the second slot side 254. The block boss 282 is positioned closer to the first slot end 248 and the block aperture 280 is positioned closer to the second slot end 250.

Next, the block boss 282 is fit into and inserted into the second curved slot 136 at the top side 146 of the pivot link member 86 and the block aperture 280 fit over the front pivot boss 132 of the pivot link member 86. The fastener element 180 including the first washer 182, the second washer 184, and the screw 186, shown in FIG. 6, is received by the pocket 296 and the screw 186 is passed through the block aperture 280 and tightened into the front pivot boss 132. Next, the kidney shaped pocket 188 of the second curved slot 136 receives the fastener element 192 including the first washer 194, the second washer 196, and the screw 198 that is tightened into the block boss 282. The screws 186 and 198 are tightened to provide a friction fit between the top side 146 of the pivot link member 86 and the bottom side 236 of the cover plate member 88. The cover plate member 88 rotates on the pivot link member 86 as the slide block member 90 and the cover plate member 88 pivot at the front pivot boss 132 to laterally move the first end 284 of the slide block member 90 and the first end 226 of the cover plate member 88 in an arcuate lateral movement. Sides of the second curved slot 136 at the top side 146 knock against the block boss 282 to stop lateral movement of the slide block member 90 and the cover plate member 88. The detent slot 262 and the detent tab 264 of the cover plate member 88 receive the detent bumps 200 and 202 of the pivot link member 86 to indicate a home position between the pivot link member 86 and the cover plate member 88.

At 352, the pivot link member 86 is attached to the guide plate member 84 and the mounting plate 206 at the back pivot aperture 130 to pivot the pivot link member 86 at the back pivot aperture 130 and laterally move at least the second end 140 of the pivot link member 86 in an arcuate lateral movement.

The bottom side 118 of the guide plate member 84 is positioned on the mounting plate 206 with the pivot aperture 100 placed over the pivot boss 208 and the slot aperture 102 placed over the slot boss 210. The latch slot 212 receives the latch 106 of the guide plate member 84 to hold the guide plate member 84 in place. Also, the bottom side 148 of the pivot link member 86 is positioned on the top side 116 of the guide plate member 84, with the smaller diameter Dia1 of the back pivot aperture 130 positioned over the pivot boss 208 and the smaller length Ls1 and width Ws1 of the first curved slot 134 positioned over the slot boss 210. The pocket 152 receives the fastener element 156 and the screw 162 is tightened into the pivot boss 208. The kidney shaped pocket 166 receives the fastener element 170 and the screw 176 is tightened into the slot boss 210. The screws 162 and 176 are tightened to provide a friction fit, such that the pivot link member 86 slides on the guide plate member 84 as the pivot link member 86 pivots at the back pivot aperture 130 and laterally moves the second end 140 in an arcuate lateral movement. Sides of the first curved slot 134 at the bottom side 148 knock against the slot boss 210 to terminate or stop lateral movement of the second end 140, and the detent bump 204 slides out of and into the detent aperture 104 of the guide plate member 84 to indicate a home position with the pivot link member 86 and the guide plate member 84 straight in line with one another.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

We claim:

1. An armrest comprising:
   a mounting plate;
   a block member;
   a link member having a first end and a second end that opposes the first end, wherein the link member is engaged with the mounting plate at a first pivot toward the first end to pivot the link member at the first pivot and laterally move the second end, and the link member is engaged with the block member at a second pivot toward the second end to pivot the block member at the second pivot and laterally move an end of the block member that faces the first end; and
   a plate member situated between the mounting plate and the link member, wherein the mounting plate includes a first boss and a second boss and the plate member includes apertures over the first boss and the second boss and the link member includes a pivot aperture over the first boss and a first curved slot over the second boss to pivot the link member at the pivot aperture and laterally move the second end of the link member.

2. The armrest of claim 1, wherein the first boss includes a first aperture and the second boss includes a second aperture and the link member and the plate member are attached to the mounting plate by a first element that engages the first aperture and a second element that engages the second aperture.

3. The armrest of claim 1, wherein the plate member includes a detent aperture and the link member includes a detent bump that engages the detent aperture to indicate a home position of the plate member and the link member.

4. An armrest comprising:
   a mounting plate;
   a block member; and
   a link member having a first end and a second end that opposes the first end, wherein the link member is engaged with the mounting plate at a first pivot toward the first end to pivot the link member at the first pivot and laterally move the second end, and the link member is engaged with the block member at a second pivot toward the second end to pivot the block member at the second pivot and laterally move an end of the block member that faces the first end, wherein:
   the block member includes a block aperture and a block boss; and
   the link member includes a pivot boss and a second curved slot, wherein the block aperture is over the pivot boss and the block boss is in the second curved slot to pivot the block member at the pivot boss and laterally move the end of the block member that faces the first end.

5. The armrest of claim 4, wherein the block boss includes a block boss aperture and the pivot boss includes a pivot boss aperture and the block member is attached to the link member by a third element that extends through the block aperture and into the pivot boss aperture and a fourth element that extends through the curved slot and into the block boss aperture.

6. An armrest comprising:
   a mounting plate;
   a block member;
   a link member having a first end and a second end that opposes the first end, wherein the link member is engaged with the mounting plate at a first pivot toward the first end to pivot the link member at the first pivot and laterally move the second end, and the link member is engaged with the block member at a second pivot toward the second end to pivot the block member at the second pivot and laterally move an end of the block member that faces the first end; and
   a cover plate member situated between the block member and the link member, wherein the link member includes a detent bump and the cover plate member includes at least one of a detent tab and a detent slot that engages the detent bump to indicate a home position of the cover plate and the link member.

7. The armrest of claim 6, wherein the cover plate member includes a longitudinal slot and the block member is situated in the longitudinal slot.

8. The armrest of claim 7, wherein the cover plate member includes a rim along at least one side of the longitudinal slot and the block member includes a recess over the rim to align the block member in the longitudinal slot and slidably engage the cover plate member between the block member and the link member.

9. The armrest of claim 6, comprising an arm pad secured to the cover plate member.

10. An arm pad assembly comprising:
    a guide plate having a pivot aperture and a slot aperture;
    a slide block having a block aperture and a block boss; and
    a pivot link having a back pivot aperture, a front pivot boss, a first curved slot, and a second curved slot, wherein the pivot aperture and the back pivot aperture are held in alignment at a back pivot and the slot aperture and the first curved slot are held in alignment to pivot the pivot link at the back pivot and laterally move a front end of the pivot link, and the block aperture is fit over the front pivot boss and the block boss is situated in the second curved slot to pivot the slide block at the second pivot aperture and laterally move a back end of the slide block.

11. The arm pad assembly of claim 10, comprising a cover plate that includes a longitudinal slot, wherein the cover plate is situated between the slide block and the pivot link and the slide block is engaged in the longitudinal slot such that the cover plate slides longitudinally between the slide block and the pivot link.

12. A chair comprising:
   a base to support the chair on a surface;
   a seat and a back supported by the base; and
   an armrest attached to the chair and supported by the base, the armrest comprising:
      a slide block including a recessed portion and a block boss;
      a cover plate including a longitudinal slot and a rim on at least one side of the longitudinal slot; and
      a pivot link including a front pivot boss and a front curved slot, wherein the slide block is situated in the longitudinal slot with the recessed portion on the rim and the cover plate is situated between the pivot link and the slide block to slide longitudinally between the pivot link and the slide block, and the block boss is situated in the front curved slot and the slide block is attached to the pivot link at the front pivot boss to pivot the slide block at the front pivot boss and laterally move a first end of the cover plate.

13. The chair of claim 12, wherein the armrest comprises a mounting plate including a first boss and a second boss and the pivot link includes a back pivot aperture and a back curved slot and the first boss is situated in the back pivot aperture and the second boss is situated in the back curved slot to pivot the pivot link at the back pivot aperture and laterally move a second end of the cover plate that opposes the first end of the cover plate.

14. The chair of claim 13, wherein the pivot link is attached to the mounting plate via a first element attached to the first boss through the back pivot aperture and a second element attached to the second boss through the back curved slot.

15. The chair of claim 12, wherein the slide block includes a block aperture fit over the front pivot boss and the slide block is attached to the pivot link via a third element attached to the front pivot boss through the block aperture and a fourth element attached to the slide block through the front curved slot.

16. The chair of claim 12, comprising an arm pad attached to the cover plate.

17. A method of assembling an armrest comprising:
   providing a link member having a first pivot situated toward a first end and a second pivot situated toward a second end that opposes the first end;
   attaching a block member to the link member at the second pivot to pivot the block member at the second pivot and laterally move an end of the block member that faces the first end; and
   attaching the link member to a plate at the first pivot to pivot the link member at the first pivot and laterally move the second end of the link member, wherein attaching the link member to the plate comprises:
      positioning a first boss of the plate in a pivot aperture of the link member; and
      positioning a second boss of the plate in a first curved slot of the link member.

18. The method of claim 17, comprising a plate member, wherein attaching the link member to the plate comprises:
   positioning the plate member between the link member and the plate;
   securing a first element into the first boss through the pivot aperture and the plate member; and
   securing a second element into the second boss through the first curved slot and the plate member.

19. A method of assembling an armrest comprising:
   providing a link member having a first pivot situated toward a first end and a second pivot situated toward a second end that opposes the first end;
   attaching a block member to the link member at the second pivot to pivot the block member at the second pivot and laterally move an end of the block member that faces the first end; and
   attaching the link member to a plate at the first pivot to pivot the link member at the first pivot and laterally move the second end of the link member, wherein attaching the block member to the link member comprises:
      positioning a block aperture of the block member over a pivot boss of the link member; and
      positioning a block boss of the block member in a second curved slot of the link member.

20. The method of claim 19, wherein attaching the block member to the link member comprises;
   securing a third element into the pivot boss through the block aperture; and
   securing a fourth element into the block boss through the second curved slot.

21. A method of assembling an armrest comprising:
   providing a link member having a first pivot situated toward a first end and a second pivot situated toward a second end that opposes the first end;
   attaching a block member to the link member at the second pivot to pivot the block member at the second pivot and laterally move an end of the block member that faces the first end;
   attaching the link member to a plate at the first pivot to pivot the link member at the first pivot and laterally move the second end of the link member;
   providing a cover plate member that includes a longitudinal slot;
   situating the block member in the longitudinal slot; and
   situating the cover plate member between the block member and the link member prior to attaching the block member to the link member, wherein situating the block member in the longitudinal slot comprises positioning a portion of the block member on a rim of the longitudinal slot.

* * * * *